US006315194B1

(12) United States Patent
Graef et al.

(10) Patent No.: US 6,315,194 B1
(45) Date of Patent: Nov. 13, 2001

(54) AUTOMATED TRANSACTION MACHINE WITH TRANSPORT PATH VERIFICATION

(75) Inventors: H. Thomas Graef, Bolivar; Damon J. Blackford, Akron; Tim Crews, Alliance; Rod Beaber, North Canton, all of OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

(21) Appl. No.: 09/664,698

(22) Filed: Sep. 19, 2000

Related U.S. Application Data

(60) Provisional application No. 60/155,281, filed on Sep. 21, 1999.

(51) Int. Cl.[7] ........................................ G06F 17/60
(52) U.S. Cl. ........................................ 235/379; 902/14
(58) Field of Search ........................................ 235/379; 902/14

(56) References Cited

U.S. PATENT DOCUMENTS 6,073,837 * 6/2000 Milne ........................................ 235/379

FOREIGN PATENT DOCUMENTS

0535543 * 4/1993 (EP) .

* cited by examiner

*Primary Examiner*—Harold I. Pitts
(74) *Attorney, Agent, or Firm*—Ralph E. Jocke; Daniel D. Wasil; Christopher L. Parmelee

(57) ABSTRACT

An automated transaction machine includes a sheet dispensing path verification system and method. The machine includes a sheet handling mechanism (17, 192) therein, including a sheet transport path (42). Devices for sensing and moving sheets are positioned adjacent to the transport path. The machine includes a control circuitry (44) which controls the various devices in response to inputs by customers. Upon receiving a transaction request from a customer which requires the dispensing of sheets, the machine verifies whether the sheet transport path to the customer is unobstructed. A test sheet is sent along the transport path to a delivery position. At least one sensor is used to verify whether the test sheet may successfully travel through the transport path. After verification that the transport path is unobstructed the sheet dispensing transaction is completed by moving further sheets to the delivery position.

27 Claims, 12 Drawing Sheets

AUTOMATED TRANSACTION MACHINE WITH TRANSPORT PATH VERIFICATION

This application claims the benefit of U.S. Provisional Application No, 60/155,281, filed Sep. 21, 1999.

TECHNICAL FIELD

This invention relates to automated transaction machines. Specifically, the invention relates to an automated transaction machine capable of verifying that the delivery path to the customer is operable prior to dispensing sheet materials.

BACKGROUND OF THE INVENTION

Automated transaction machines are known in the prior art. A common type of automated transaction machine is an automated teller machine (ATM). ATMs have been developed which are capable of performing a variety of transactions including the dispensing of currency notes. ATMs are commonly used by individuals to receive cash from their accounts, to pay bills, to transfer cash between accounts, and to make deposits. Certain ATMs also have the capability of delivering and receiving various types of sheet materials. For example, some ATMs dispense materials such as tickets, travelers checks, money orders, bank checks, scrip, stamps, vouchers, gaming materials, lottery tickets, transit tokens, or other sheet materials stored in or produced by the machine. Other types of transaction machines dispense notes and other types of sheets to users such as bank tellers, cashiers, and other service providers. Automated transaction machines generally dispense such materials while operating to enable appropriate charges and credits to be applied to the respective accounts of the customer, the machine owner, and/or the provider of the dispensed materials. For purposes of this description an automated transaction machine will be considered as any machine that carries out transactions including transfers of value.

Customers also commonly receive from an ATM a printed sheet which is a receipt indicating the particulars of the transactions they have conducted at the machine. In addition customers may request and receive from some ATMs a more detailed statement of transactions conducted on their account.

ATMs currently in use often have different areas on the machine where sheets are received from or delivered to a customer. For example, most machines include one area for delivering cash to a customer and another area for receiving deposits.

Automated transaction machines that dispense notes or other types of sheets representative of value are generally constructed to prevent unauthorized persons from accessing the supply of sheets held inside the machine. Automated transaction machines typically include a generally secure chest or enclosure. The interior of the enclosure includes storage areas for currency notes and other types of sheet materials. Automated transaction machines may include several different passageways, devices and transports which operate to deliver sheet materials from storage areas in the machine to users.

Unfortunately, some unscrupulous individuals on rare occasions are successful in tampering with the machine. Sometimes this is done by placing objects through a sheet delivery opening. Such tampering may corrupt the operation of the machine and prevent the final delivery of sheet materials to the customer. Therefore, a customer's account may be charged the value of the requested sheet materials without the customer ever receiving the sheet materials. In some cases such unscrupulous individuals may return to the machine after the sheets of an authorized user have become trapped inside the machine near the delivery opening and attempt to extract them.

Thus there exists a need for an automated transaction machine that reduces the risk that the sheet delivery capability of the machine will be corrupted. There further exists a need for an automated transaction machine which is capable of verifying that the sheet material delivery path to the customer is properly operable prior to attempting to deliver at least some sheet materials from the machine. There further exists a need for an automated transaction machine with a reduced risk of tampering.

OBJECTS OF THE INVENTION

It is an object of the present invention to provide an automated transaction machine.

It is a further object of the present invention to provide an automated transaction machine which has an enhanced level of security.

It is a further object of the present invention to provide an automated transaction machine that enables verification of the operation of the sheet dispenser path.

It is a further object of the present invention to provide a method for operation of an automated transaction machine in which a sheet delivery path verification test method is conducted prior to dispensing at least one of the sheets requested by a user.

It is a further object of the present invention to provide a method for operation of an automated transaction machine in which a first sheet, such as a test sheet, a coupon, promotional material or a low denomination currency sheet, is first dispensed prior to dispensing other sheets requested by the customer.

It is a further object of the present invention to verify that the sheet dispensing path in the machine to the customer is fully functional prior to dispensing sheets of substantial monetary value.

It is a further object of the present invention to provide an automated transaction machine that may be readily configured to provide a plurality of banking transactions.

It is a further object of the present invention to provide an automated transaction machine that is economical to manufacture and operate.

It is a further object of the present invention to provide an automated transaction machine that accepts and delivers various types of sheets and documents.

Further objects of the present invention will be made apparent in the following Best Modes for Carrying Out Invention and the appended claims.

The foregoing objects are accomplished in an exemplary embodiment of the present invention by an automated transaction machine. The machine includes therein a transport arrangement which moves sheets or stacks of sheets from one or more sheet storage areas in the machine, along one or more transport paths, to a dispenser outlet opening accessible by the customer.

In operation of the machine, a machine controller including a processor operates responsive to programmed instructions to carry out steps to verify that the sheet dispensing path is open and working properly prior to attempting to complete a requested sheet material dispensing transaction. In one exemplary form of such instructions the machine, after receiving a request for a transaction from the customer which requires the dispensing of sheets, operates so that a sheet, such as a test sheet, a coupon, promotional material, or a low denomination currency sheet, is first sent through the dispenser path to a customer accessible sheet outlet opening. At least one sensor verifies whether the sent sheet actually reached the area of the customer accessible sheet outlet opening. If the sent sheet is verified as having reached the sheet outlet opening, then the dispenser path is deemed operable by the controller. The requested sheet dispensing transaction may then proceed. However, if the test sheet is not verified as having reached the customer accessible sheet outlet opening, then the machine suspends dispensing operations and indicates that a malfunction has occurred.

Additionally, or in the alternative, the transaction machine may be programmed and arranged to self-test for proper dispensing path operation. This may be done periodically independent of user transactions, at the beginning or end of each transaction, or at other times. In conducting a self-test the controller may operate the machine so that the machine sends a sheet from a storage area to adjacent a customer accessible sheet outlet opening. At least one verification sensor positioned adjacent the sheet outlet opening would detect the sent sheet. Upon the sent sheet being detected at the sheet outlet opening, the sent sheet would then be moved within the machine so that it is moved to a separate divert storage area or recycled for reuse by being moved to a sheet storage area from which the sheet may again be dispensed.

DESCRIPTION OF THE PREFERRED EMBODIMENT

The present invention may be used with various automated transaction machines. For a better understanding of the present invention, a discussion of some exemplary automated transaction machines is provided. A description of how the dispensing path verification method is implemented in the exemplary automated transaction machines is also provided.

Examples of operations and arrangements for handling, storing, transporting, and dispensing sheets are shown in co-pending U.S. patent application Ser. No. 08/980,467, filed Nov. 28, 1997 corresponding to International Publication No. WO 99/28870 dated Jun. 10, 1999; U.S. patent application Ser. No. 09/313,480, filed May 17, 1999 corresponding to International Patent Publication No. WO 00/31670 dated Jun. 2, 2000; and U.S. Pat. No. 5,240,368; the disclosures of which are herein incorporated by reference. It should be understood that the devices and arrangements discussed hereafter are exemplary and that additional or different devices and arrangements may be included in other embodiments of the invention.

Figure 1:
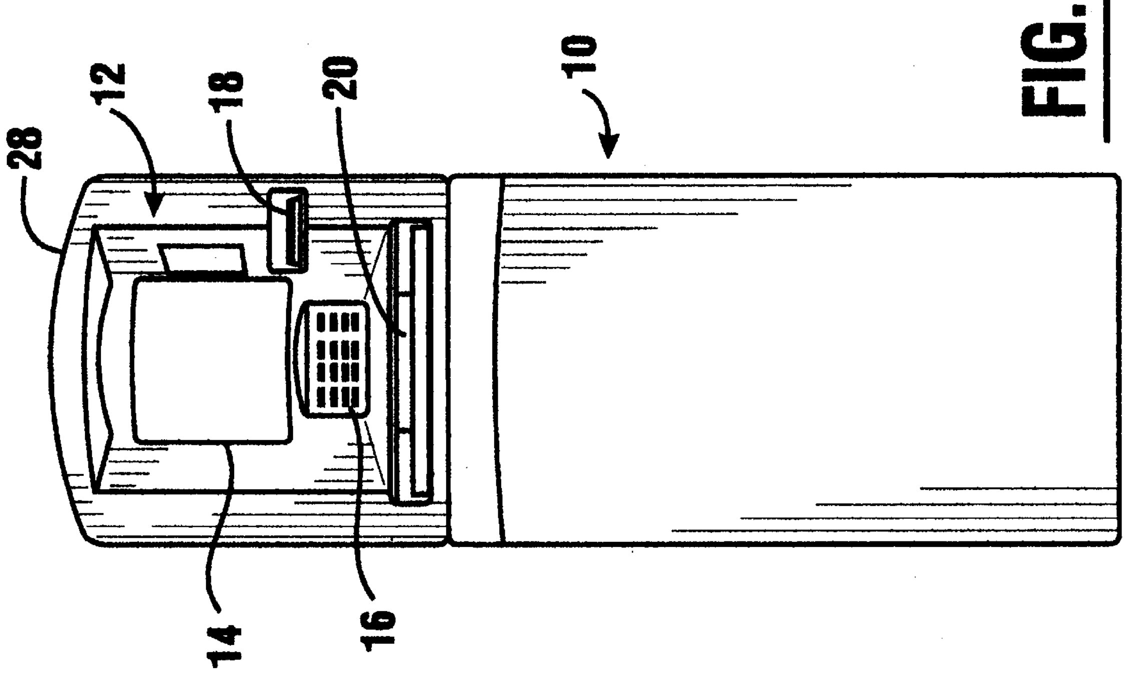
FIG. 1 is a front plan view of an automated transaction machine of an exemplary embodiment of the present invention.

An automated transaction machine in which the present invention may be utilized is shown in FIGS. 1–6 which are similarly described in the above mentioned U.S. patent application Ser. No. 08/980,467, filed Nov. 28, 1997. Referring now to the drawings, and particularly to FIG. 1, there is shown therein an automated transaction machine generally indicated 10. Machine 10 is an ATM, however other embodiments of the invention may be used in connection with other types of automated transaction machines. ATM 10 includes a user or customer interface generally indicated 12. Customer interface 12 includes a touch screen 14. Touch screen 14 serves as both an input device and an output device. The touch screen enables outputs through displays on the screen and enables customers to provide inputs by placing a finger adjacent to areas of the screen.

Customer interface 12 further includes a keypad 16. Keypad 16 includes a plurality of keys or buttons which may be actuated by a customer to provide inputs to the machine. Customer interface 12 further includes a card reader slot 18. Card slot 18 is used to input a card with encoded data thereon that identifies the customer and/or the customer's account information. Card slot 18 is connected to a card reader in the machine for reading data encoded on the card.

Customer interface 12 further includes an opening 20. Opening 20 is used to deposit sheet materials or documents received from a customer operating machine 10. Opening 20 may also used to deliver sheet materials to customers operating the machine. Although opening 20 is shown exposed in FIG. 1, it should be understood that in other embodiments it may be selectively covered by a movable gate, door or similar closure structure. Alternatively, the machine may have respective separate openings for deposits and withdrawals.

Figure 2:
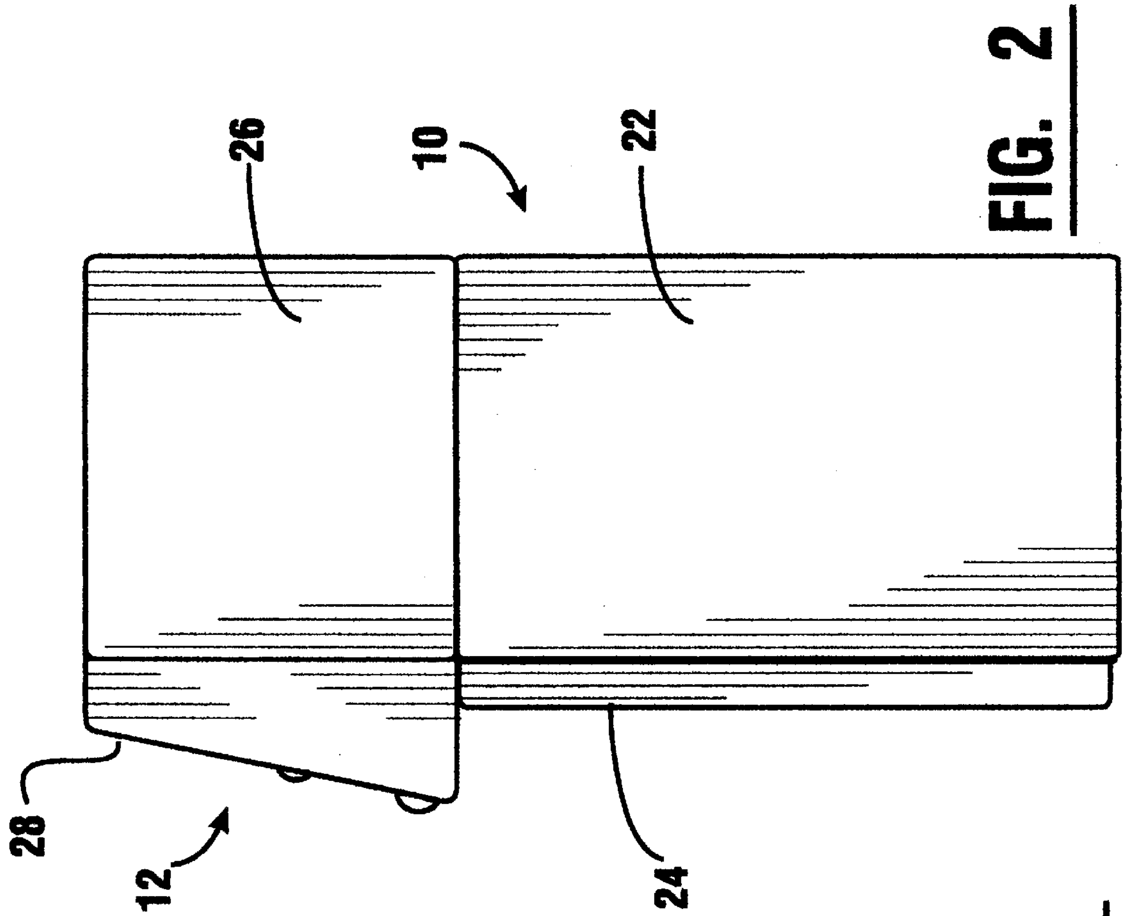
FIG. 2 is a left side view of the automated transaction machine shown in FIG. 1.

As shown in FIG. 2 machine 10 has a generally divided body structure which includes a chest portion 22. Chest portion 22 is preferably a secure chest and is used for holding items of value such as currency and deposits. Chest portion 22 has a door 24 which can be selectively opened to gain access to the interior of the chest portion. Door 24 preferably includes a combination lock or other locking mechanism (not shown) which prevents the chest portion from being opened by unauthorized persons.

Machine 10 further includes an upper enclosure portion 26. The upper enclosure portion has the customer interface 12 thereon. The customer interface portion 12 includes a fascia 28. Fascia 28 is preferably movably mounted on the upper enclosure portion 26 and may be selectively opened to gain access to components housed in the upper enclosure portion. A locking mechanism (not shown) is preferably included in the upper enclosure portion for preventing unauthorized persons from gaining access to the interior thereof.

Figure 3:
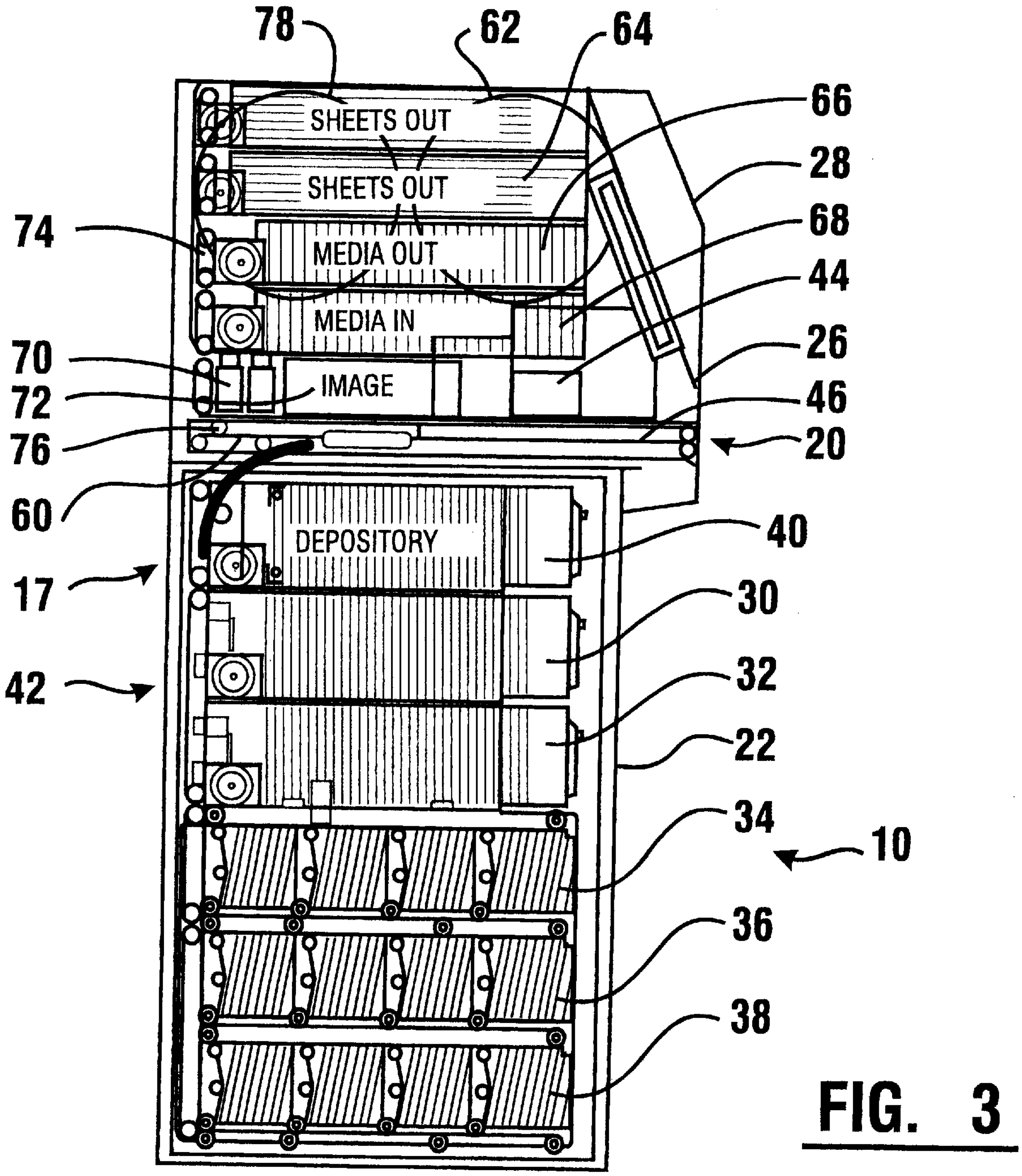
FIG. 3 is a schematic cross sectional view of the automated transaction machine shown in FIG. 1.

As shown in FIG. 3 machine 10 includes a plurality of devices for carrying out banking transactions. The interior of ATM 10 is schematically shown in FIG. 3. The ATM includes several sheet dispensing devices and sheet receiving devices. Among the sheet dispensing devices are currency dispensers 30 and 32. Currency dispensers 30 and 32 may be similar to the type shown in U.S. Pat. No. 4,494,747, which is incorporated herein by reference. The dispensers selectively dispense sheets one at a time in response to control signals from a terminal controller. Currency dispensers 30 and 32 may include removable sheet holding containers or canisters which include indicia thereon. The canisters may be interchangeable and of the type shown in U.S. Pat. No. 4,871,085, which is also incorporated herein by reference. The indicia on the sheet holding canisters is preferably indicative of the type and/or properties of sheets held therein (for example currency type and denomination) and the indicia is read by a reading apparatus when the canister is installed in the machine.

The ATM operates in response to the indicia on the canisters to adjust the operation of the dispensers to conform to the canister contents and position. The information represented by the indicia is read by the reading apparatus, and the resulting signals are transmitted to the machine control circuitry. The control circuitry including the controller, may adjust operation of the sheet dispensing and receiving devices in response to the signals to conform to the type and character of the sheets held in the various canisters.

In the exemplary embodiment of machine 10 shown in FIG. 3, the machine preferably includes a sheet handling mechanism 17 including sheet receiving and delivering devices 34, 36 and 38. The sheet delivering and receiving devices enable receiving and storing sheets in selected storage areas, as well as selectively delivering sheets from the various storage areas. An exemplary form of the sheet receiving and delivering devices is shown in U.S. patent application Ser. No. 09/193,530 filed Nov. 17, 1998 corresponding to International Patent Publication No. WO 99/28056 dated Jun. 10, 1999, the disclosure of which is incorporated herein by reference. Machine 10 further includes an envelope depository schematically indicated 40. Depository 40 is a device configured to accept and hold relatively thick and potentially non-uniform deposit items such as deposit envelopes deposited by customers in the machine.

Depository 40, currency dispensers 30 and 32 and sheet receiving and delivering devices 34, 36 and 38 are all positioned within the chest portion 22 of the machine 10. In the exemplary embodiment, the sheet dispensing and receiving devices, except for the depository, may be interchangeably positioned in the machine. The control circuitry adjusts operation of the machine accordingly based on the device positions and the indicia on the canisters or devices.

Each of the currency dispensers 30 and 32, sheet receiving and delivering devices 34, 36 and 38, and the depository 40 are in communication with a sheet transport path generally indicated 42. Sheet transport path 42 comprises a plurality of sheet transport sections which are aligned and in operative connection through a rear area of the chest portion. Sheet transport path 42 may include one or more sheet transports of the type shown in U.S. Pat. No. 5,240,368. Each of the depository 40, currency dispensers 30 and 32, and sheet receiving and delivering devices 34, 36 and 38 are in operative connection with the sheet transport path 42, and are enabled to deliver sheets to and/or receive sheets from the sheet transport path 42.

Sheet transport path 42 extends through an opening (not separately shown) in the chest portion 22 of the ATM chest. Wiring that connects components located in the chest portion with components in the upper enclosure portion 26 also extends through an opening in the chest portion and is connected to control circuitry, schematically indicated 44. The control circuitry 44 preferably includes at least one controller. The machine controller includes at least one processor in operative connection with at least one memory. The controller carries out programmed instructions based on data stored in the memory. The at least one controller may comprise a plurality of processors. The control circuitry is operative to control the operation of the machine. This is done by controlling the operation of moving devices such as motors, solenoids, linear actuators, servos, rotary actuators and other devices which move and position components in the machine, as well as by controlling modems, interfaces and other components which enable electronic communication of components within the machine and communication of the machine with external networks and systems.

Upper enclosure portion 26 also includes various sheet dispensing and receiving devices. These dispensing and receiving devices may include dispensers similar to those shown in U.S. Pat. No. 4,494,747 and may include removable canisters for holding sheets therein. Such removable canisters may also include indicia of the type described in U.S. Pat. No. 4,871,085, which are read by apparatus within the machine. The control circuitry may be operative to control the operation of the machine in response to the indicia in a manner similar to that described in the incorporated patent disclosure.

Sheet dispensing devices 62 and 64 may hold and dispense sheets such as blank receipt or statement forms. Alternatively, one of such canisters may hold instruments which must be completed, such as scrip forms or travelers checks. A further sheet dispensing device 66 may dispense bank checks or stamps.

A sheet receiving device 68 may also be included in the upper enclosure portion. Sheet receiving device 68 may be used for holding sheets such as checks, which have been input by a customer to the machine and which have been imaged and/or canceled through processing in the machine.

The upper enclosure portion further includes a printing device schematically indicated 70. Printing device 70 is used for selectively printing on sheets under control of the control circuitry. An imaging device schematically indicated 72 is also included. Imaging device 72 may be of the type which enables reading and generating an electronic image of a document, such as that shown in U.S. Pat. No. 5,534,682.

The sheet dispensing devices 62, 64 and 66, as well as the sheet receiving device 68, are all in communication with one or more transports. These transports may be of the type shown in U.S. Pat. No. 5,342,165, or other suitable sheet transport devices. The sheet transport devices form a sheet transport path 74. Sheet transport path 74 extends to transport path 46 and meets transport path 46 at a second intersection 76.

The upper enclosure portion may also include additional or other devices. Such devices may include ajournal printer as schematically indicated by paper rolls 78. The journal printer is used to make a paper record of transactions conducted at machine 10. The journal printer prints transaction information on the paper which incrementally moves from one roll to another as transaction information is recorded thereon. Electronic journals may also be made by the control circuitry and stored in memory. Other devices which may be included in the machine are audio output devices, customer sensors, biometric readers, cameras and recorders, and other apparatus suitable for use in the operation of the particular type of automated transaction machine.

Figure 4:
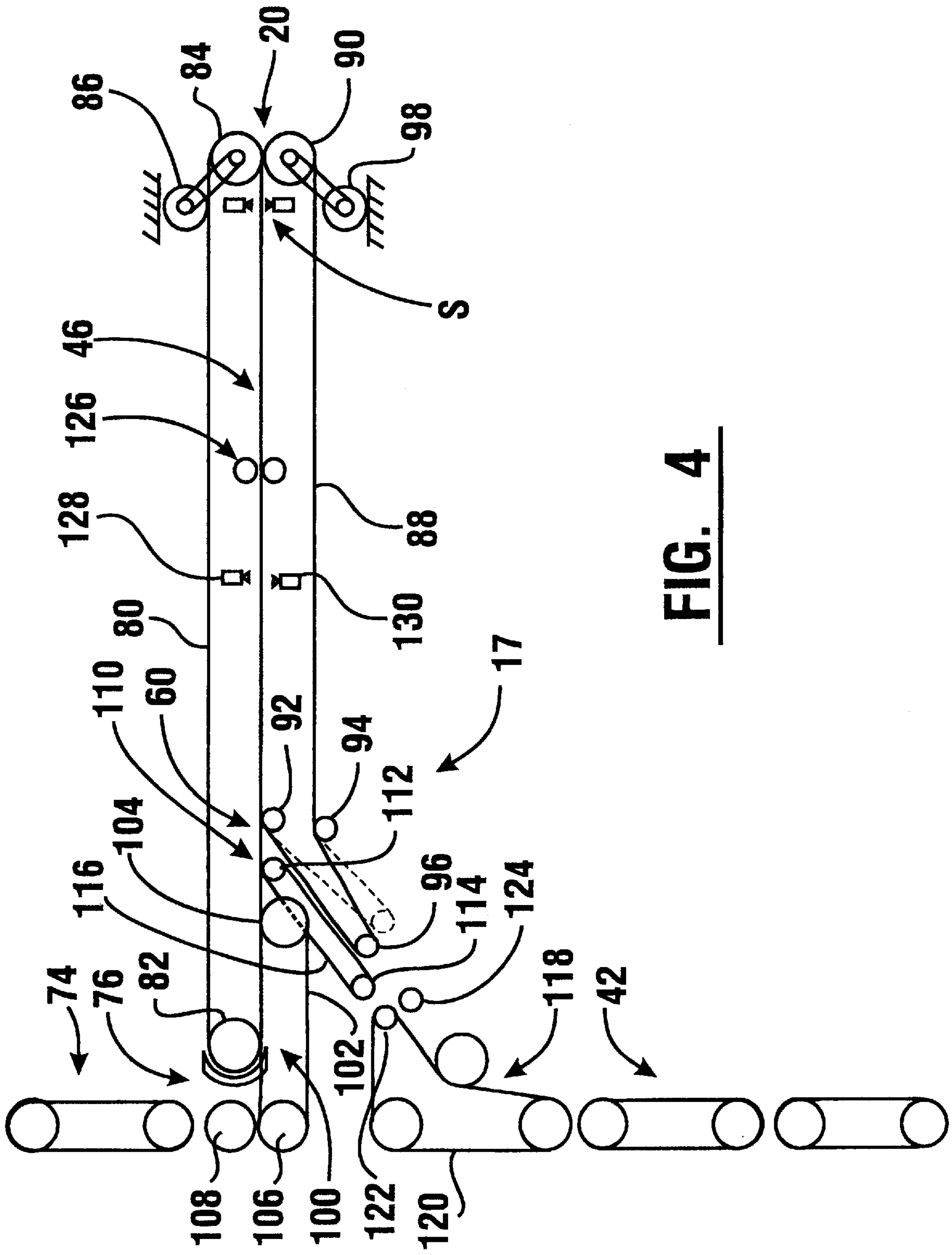
FIG. 4 is a side schematic view of a path in the automated transaction machine of FIG. 1.

Transport paths 42, 46 and 74 which make up the sheet dispensing path within the machine are shown in greater detail in FIG. 4. A single outlet position sensor S is schematically shown, although it should be understood that a plurality of position sensors in a plurality of positions may be used. Transport path 46 may include one or more transports of the interwoven belt type. The transport path may have therein a plurality of first belts 80 which extend between first rolls 82 and 84. First rolls 82 and 84 are selectively driven by a reversible drive, schematically indicated 86.

Second belts 88 extend between a second roll 90 and rolls 92, 94 and 96. Second belts 88 are driven by a second reversible drive schematically indicated 98. As shown in FIG. 4, roll 96 is selectively movable. Of course it should be understood that the belts and rolls shown in the first transport path 46 are actually a plurality of spaced belts and rolls.

First transport path 46 further includes a further transport section 100. Transport section 100 includes a plurality of third belts 102 journaled on spaced rolls 104 and 106. Rolls 106 have positioned adjacent thereto a plurality of holding rolls 108. Rolls 108 are positioned in spaced axial intermediate relation of third belts 102. Holding rolls 108 and transport section 100 are independently driven by reversible drives (not shown) under the control of the control circuitry 44.

Adjacent to first intersection 60, where sheet path 42 meets sheet path 46, is a sheet directing apparatus generally indicated 110. Sheet directing apparatus 110 includes sheet engaging rolls 112 and further rolls 114. Rolls 112 and 114 have resilient belts 116 mounted thereon. It should be understood that rolls 112 and 114 are driven by an independent reversible drive (not shown) under control of the control circuitry 44. It should be understood that rolls 112 and 114 and belts 116 in FIG. 4, represent a plurality of such belts and rolls which are preferably disposed in intermediate relation between the lower flights of first belts 80.

Transport path 42 further includes transport 118 which is adjacent to depository 40. Transport 118 includes a plurality of rolls which drive belts 120 in response to a reversing drive (not shown). Rolls 122 which are engaged with belts 120, as well as rolls 124 which are independently driven by a reversible drive (not shown), are positioned in the sheet path 42 adjacent to rolls 114 and 96.

As schematically represented in FIG. 4, transport paths 42, 46, 74 include sensing devices. These sensing devices are in operative connection with the control circuitry 44, and operate to sense features of sheets and positions of sheets in the sheet transport paths. A sheet position sensor S senses or detects the presence of a sheet at a delivery position adjacent to opening 20. A thickness sensor schematically indicated 126 is preferably provided for sensing the thickness of sheets, stacks of sheets, or sheet like deposit envelopes that move along transport path 46. Indicia reading devices 128 and 130 are preferably operative to sense indicia on sheets and envelopes moving in the transport path. The sensing devices may include photo reflective devices, magnetic sensing devices or other appropriate devices for distinguishing currency, various types of negotiable instruments and deposit envelopes, as well as for sensing other properties and sheet positions. Further sensors for sensing the positions or properties of sheets may be strategically located at positions along the sheet path. The particular type and position of the sensing devices used in a particular machine will depend on the characteristics and types of documents which are intended to be processed by the machine.

Figure 5:
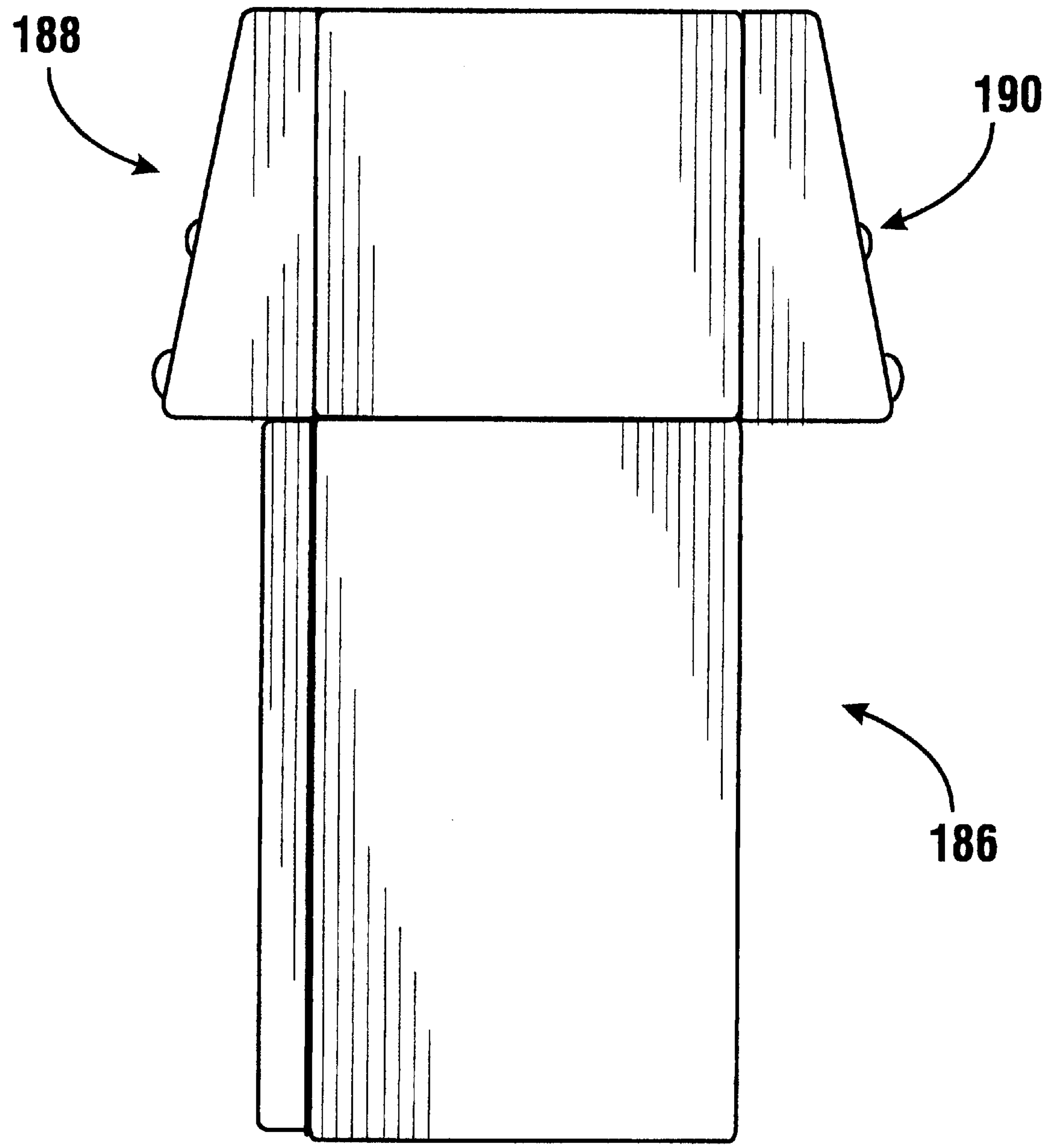
FIG. 5 is a side view of an alternative embodiment of an automated transaction machine which includes two customer interfaces and customer accessible sheet dispensing openings.

An alternative embodiment of an automated transaction machine incorporating the present invention is indicated 186 in FIG. 5. Machine 186 is similar to machine 10 except that it includes two fascias and customer interfaces designated 188 and 190. Machine 186 is capable of operation by two customers generally simultaneously.

Figure 6:
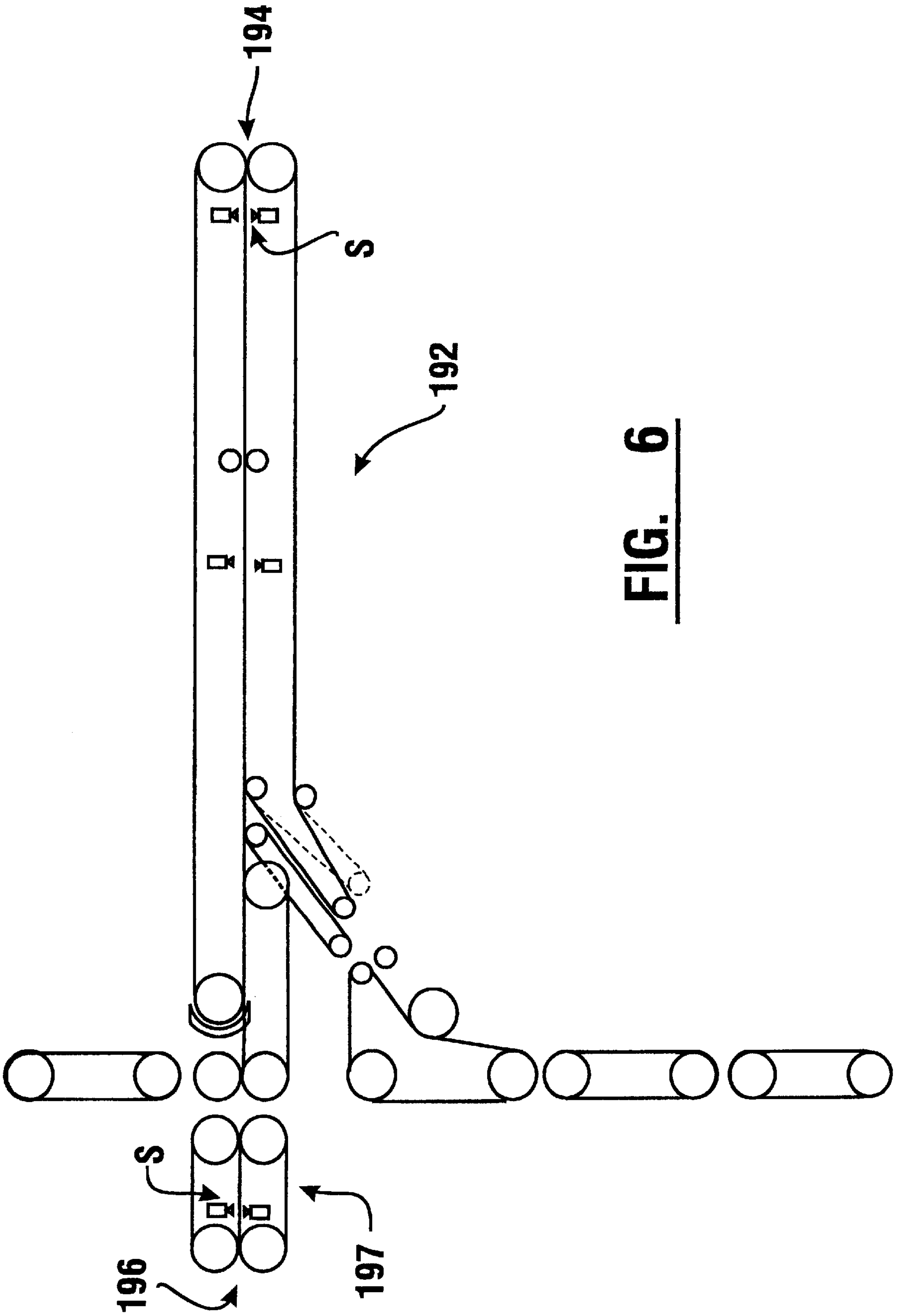
FIG. 6 is a side schematic view of the transport path of the automated transaction machine shown in FIG. 5.

The sheet handling mechanism for machine 186 is indicated 192 in FIG. 6. The sheet handling mechanism 192 is similar to that previously described, except as otherwise noted. Mechanism 192 includes a first customer accessible opening 194 in customer interface 190, and a second customer accessible opening 196 in customer interface 188. Customer opening 196 receives and delivers sheets through a transport section 197. Transport section 197 may be an interwoven belt type transport and is capable of moving sheets, envelopes and stacks of sheets in engagement therewith. Transport section 197 is operated by a reversible drive similar to the reversible drives used for the other belt transport sections, and is in operative connection with the control circuitry of the machine.

The operation of the alternative sheet handling mechanism 192 is similar to that previously described except that the sheets, envelopes, or stacks of sheets that are processed may be received from or delivered to either customer opening 194 or customer opening 196. Because of the high speed capability of the exemplary machine it is possible for the sheet handling mechanism 192 to adequately service two customers simultaneously without undue delay.

In operation of the present invention, the customer provides inputs or other information which enables the machine or other computers or networks to which the machine is connected, to determine that a user is authorized to conduct a transaction. If during the use of the machine a transaction request is made which may require the dispense of sheets, then the controller operates in accordance with its programming to cause a dispensing path verification process to be executed. In accordance with an exemplary verification process, a single sheet, such as a test sheet or promotional material such as a coupon or advertising sheet, a blank sheet, a printed sheet, or a low denomination currency sheet, is first sent through the dispenser path to a delivery position adjacent the customer accessible opening. Hereinafter, for purposes of clarity and convenience, such a sheet shall be referred to as a "test sheet", it being understood that the present invention finds advantageous application to the identified types of sheets and other sheet types. The low denomination currency sheet may comprise the lowest denomination currency sheet available in the machine and that can be included in the total currency amount requested by the customer. In such an arrangement where the test sheet is a low denomination currency sheet, then this single low denomination currency sheet would be sent first to the position adjacent the customer accessible opening. In some embodiments of the invention the test sheet may be delivered through the opening to the customer while in others the test sheet is moved only in close proximity to the opening but is not accessible to the customer. The approach taken will depend on the machine and the nature of sheet movement considered necessary to establish that the sheet path has not been subject to tampering.

In executing the exemplary verification process, signals from at least one verification sensor S located adjacent to the customer accessible sheet outlet opening is used to verify that the test sheet will reach the customer. The sensor S may be operative to sense the leading edge, or the trailing edge, or both edges of the test sheet adjacent the sheet outlet opening. The sensor S is operable to indicate to the controller whether the test sheet was in a position accessible to the customer. Therefore, the position sensor would verify that the test sheet may successfully reach the outlet opening. A successful transport of the test sheet to determine the availability of the dispensing path may also be time dependent such that the test sheet must be sensed as reaching the destination within certain time parameters. The signals from the sensor sensing the test sheet are operative to indicate to the controller that the sheet dispensing path has not been tampered with and that the machine may proceed to attempt to deliver additional sheets to the customer in the course of transactions that the customer may request.

Verification sensors S may additionally be positioned at additional strategic locations, such as the entry and exit locations of the transport paths. Alternatively, it may be that only the last portion of the path that the requested currency sheets would travel on the way to a customer would need to be verified with appropriate sensor devices to meet the desired level of security or verification of proper machine operation.

The verification process steps may further require the controller to analyze signals from each sensor used to sense a test sheet moved in the machine in a step by step predetermined sensing order. The predetermined sensing order may require the steps of a first sensor sensing the test sheet, then the next adjacent sensor along the transport path sensing the test sheet, then the first sensor no longer sensing the test sheets and so on. The predetermined sensing order may include a first sensor and each subsequent sensor along the dispensing path to the last sensor located adjacent the sheet outlet opening to the customer. It should be understood that sensors along the dispensing path may include sensors that directly sense sheets as well as sensors for gates, mechanisms or other devices which must operate to have a test sheet reach the customer.

The process may further require, for example at the beginning of the verification process, prior to dispensing the test sheet from the storage area, that each sensor does not sense a sheet or the presence of some object or condition which may suggest the presence of a foreign object or tampering. A sensing of a sheet or object, prior to any test sheet being transported, may be resolved by the controller as indicative of possible machine tampering and cause the controller to avoid attempting to dispense the test sheet or any other sheets to a customer. Hence, the verification may comprise a two-way verification process. If a sensor senses a sheet or foreign object at the beginning of the verification process, or if a sensor senses a sheet or foreign object out of the predetermined expected sensing order, then the controller would indicate a fault and prevent the further attempted dispensing operations of the machine and indicate that a malfunction has occurred. In a fault situation, the machine would be prevented from attempting to carry out further sheet dispensing transactions to any customer until the condition is corrected. The servicing personnel could reset the control processor to correct the fault by clearing any obstructions in the dispensing path and correcting the effects of tampering.

The controller, upon the fault condition being detected at the machine, may automatically notify the proper authorities, such as banking officials and/or law enforcement officials. The notification may precisely indicate which sensor caused the verification process to indicate a fault. The location of the individual sensor in the machine that caused the fault to be indicated may be used to determine which type of authorities should be notified. For example, if the sensor located adjacent the sheet outlet opening to the customer detected an abnormal item or operation, then such condition may be indicative of machine tampering. In such a situation, the programming associated with the controller may cause the generation of signals to additionally notify the law enforcement officials. A precise indication of which sensor caused the machine fault condition would also be useful to servicing personnel in repairing or resetting the machine to proper operation. Alternatively or in addition, a video image capture system such as the AccuTrack™ System available from Diebold, Incorporated may be included in or near the machine. Such a system may be used to capture images of persons sensed as adjacent to the machine including persons conducting transactions. In the event tampering with the transport path is sensed, image data from persons involved in the current transaction and prior transactions may be recovered and analyzed to determine the person responsible for the tampering.

Upon the verification process detecting a fault, the requested transaction which involves providing sheets to the customer is not carried out. Therefore, the customer's account would not be charged the transaction amount for a requested withdrawal for example. The controller may be programmed to generate a signal, upon fault detection in the verification process that causes the machine to display a message indicating that withdrawal transactions are currently unavailable.

The controller may be alternatively programmed to routinely recheck sensor status to determine if a sensor, which was indicating an abnormal condition during the verification process, no longer senses such an abnormal condition. If the status of the sensor has changed, then the controller may operate responsive to its programming to maintain the machine unavailable or may cause the machine to again be available for withdrawals or other sheet dispensing transactions. In either case, the proper officials may again be automatically notified that a sensor status has changed from a fault condition to a normal condition. Image date, if available may also be analyzed to determine the identity of individuals involved in any tampering.

In operation, if a transaction request is made which includes the dispense of sheets and the transport of the test sheet indicates that sheets may properly reach the customer, then the dispensing path is deemed verified as open. Thereafter, the requested sheet dispensing transaction (or the balance of the sheet dispensing transaction in cases where the test sheet is a low denomination note) proceeds responsive to operation of the controller.

The test sheets may be stored in separate sheet canisters or they may be stored, in a separated manner, together with the currency sheets in the same canisters. Hence, the test sheets may be stored in sheet dispensing devices 62 and 64, sheet receiving and delivering devices 34, 36, and 38, or currency dispensers 30 and 32. Additionally, one or more canisters may be added or modified to store only sheets which serve as test sheets. A plurality of verification sensors S may be located along transport paths 42, 46, and 74. In this exemplary embodiment at least one sensor S is located adjacent outlet opening 20. In the case of the exemplary machine having two customer interfaces shown in FIGS. 5 and 6, the verification sensors S may additionally be located along transport path 197. In this exemplary embodiment at least one sheet sensor S is located adjacent outlet openings 194 and 196.

In the event that in carrying out the verification process the test sheet is presented but is not taken, then the controller may be programmed to retract the test sheet into a selected one of sheet receiving devices 34, 36, or 38. The decision to retract the untaken test sheet may be based on a position sensor sensing the test sheet in the customer accessible outlet opening 20 for a predetermined period of time. The controller is operative to direct the untaken test sheet along appropriate transport paths to the storage location. The retraction of the untaken test sheet may be useful in keeping the area adjacent the machine free of untaken test sheets. Therefore, the retracting of the discarded test sheets back into the machine for storage maintains a clean environment. Furthermore, the presented but untaken test sheets may be recycled for reuse in a recycling type of machine arrangement. Alternatively, in some embodiments it may not be necessary to make the test sheet available to the customer to prove the sheet path is unobstructed. In such cases when the machine is operating properly the test sheet may always be retracted for reuse.

Additionally, the machine may be programmed and arranged to self-test itself for dispensing path verification. For example, after receiving a request for a transaction or on a periodic basis such as after a predetermined period of time, the machine would first send a test sheet from a storage area adjacent to or into the customer accessible outlet opening. The test sheet may only be adjacent the customer accessible outlet opening for a brief time. At least one sensor adjacent the outlet opening would be positioned to detect the test sheet. Upon the test sheet being detected at the outlet opening or at another position indicative that the dispensing path is unobstructed and the machine is operating properly, the test sheet would then be retracted into the machine. The test sheet may be diverted to storage or recycled for reuse. The customer may be unaware that the verification process ever occurred. Therefore, customer involvement would not be necessary in the execution by the machine of the self-test verification process. The verification process may be simple and customer friendly. In such embodiments of the invention test sheets would not become available to the customer and would not be discarded in the area adjacent the machine. Once again, if the test sheet never reached a position that is indicative of proper operation, then the machine would indicate a fault condition and avoid attempting dispensing transactions that cannot be properly accomplished.

It should be understood that in embodiments of the invention, the controller in the machine may be programmed to selectively use the verification process in advance of certain transactions while not requiring such verification in advance of others. For example, in the embodiment of the invention shown in FIG. 1, the common transport path is used for the delivery of account statements and currency bills and other sheets. In the situation where a customer has requested a transaction involving only a delivery of a statement the machine may operate in accordance with its programming, not to move a test sheet in advance of such delivery. This may be done because the statement requested by the customer is of no monetary value and its interception by an unauthorized person will be of little consequence. Likewise, the machine may operate in accordance with its programming to not conduct transport path verification prior to delivery of sheets in other types of transactions. These may include for example, currency dispensing transactions involving amounts less than a particular threshold. Of course in alternative forms of the invention where the test sheet is a coupon, advertisement or other promotional item which is desirable to deliver to the customer for business reasons, the transport path verification operation may be conducted as part of each transaction. These may include for example, transactions that do not otherwise require the delivery of a sheet to a customer. Various approaches may be carried out responsive to the programming associated with the controller and depending on the needs and desires of the operator of the machine.

In this exemplary embodiment the instructions, which are operative to cause one or more processors operating in the ATM to carry out the steps to verify that the transport path is unobstructed, comprise software. The software instructions are stored in one or more data stores that are in operative connection with the processor in the ATM. The instructions which comprise the software may be stored on machine readable media for loading or execution by the machine. Such machine readable media may include magnetic media such as a diskette or hard disk drive. Alternatively, such media may include media that may be read in other ways such as a CD, a plug-in memory or a smart card. Many types of machine readable media capable of holding instructions and being read for purposes of transferring to a memory and or execution by a processor may be used in embodiments of the invention. Further, in some embodiments the transport path verification capabilities of the machine may be achieved by modifying the programming of existing automated transaction machines in the field. In such cases, the benefits of the invention may be achieved by modifying the programming of the machines.

Another exemplary embodiment of an automated transaction machine in which the present invention may be implemented is shown in FIGS. 7–10. The automated transaction machine includes sheet handling and dispensing mechanisms similar to those shown in the above mentioned U.S. patent application Ser. No. 09/313,480, filed May 17, 1999.

Figure 7:
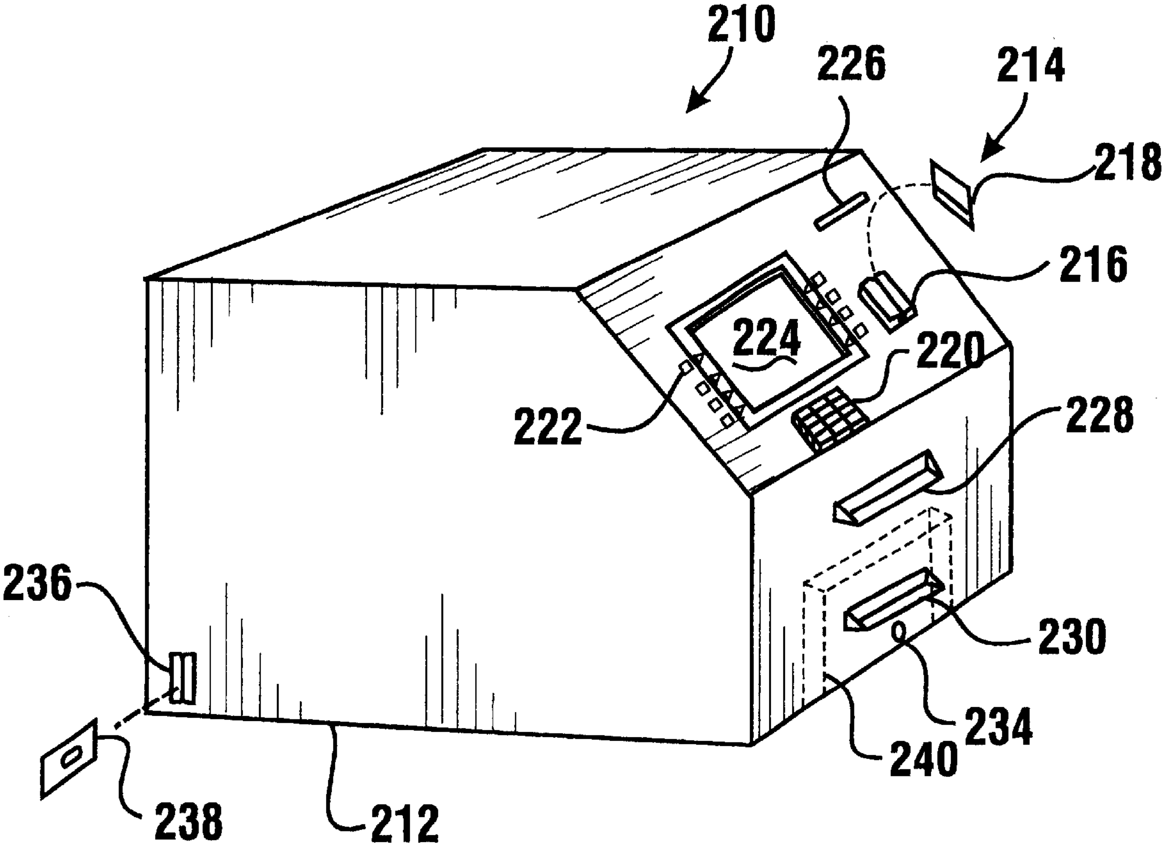
FIG. 7 is an isometric view of an alternative exemplary embodiment of an automated transaction machine of the present invention.

As shown in FIG. 7, the exemplary machine 210 includes a housing 212; customer interface 214; card reader 216; card 218; keypad 220; function keys 222; display 224; receipt opening 226; sheet material outlet opening 228; sheet material inlet opening 230; cover 240; locking mechanism 234; connector 236; and plug-in memory element 238.

The machine 210 is an automated transaction machine whose functions include the dispense and receipt of currency notes. It should be understood however that other embodiments may include conducting other types of transactions such as those previously discussed.

The housing 212 of machine 210 refers to the external enclosure of the machine as well as the internal structures which support components of the machine therein. The interface is generally supported on the housing and is accessible by a user or customer. The customer interface as shown includes input devices and output devices.

Customer interface 214 may also include other input devices such as keypad 220 and function keys 222. Users are enabled to input data and instructions to the machine by selectively pressing the keys which make up the keypad as well as the function keys 222.

The interface 214 further includes an output device such as display 224. The display 224 may for example be a CRT or LCD type display that is operative to display messages to a customer, including messages which instruct the customer in operation of the machine.

One input device may be a swipe type card reader 216 operative to read magnetic stripe cards 218 which are passed through the reader by customers. The reader may alternatively comprise motorized readers or dip readers. Other types of input devices may be used which read articles such as articles encoded with optical indicia which can be used to identify the customer or their accounts. Other types of input devices may include biometric type reading devices such as fingerprint readers, retina scan devices, iris scan devices, speech recognition devices, or other types of input devices which are capable of providing an input which can identify a particular customer and/or their accounts. The keypad 220 and function keys 222 which serve as input devices may be replaced or supplemented in other embodiments with other types of devices which are capable of selectively receiving data or instructions from a customer. Other types of output devices may also be used in embodiments of the invention. These may include other types of visual and nonvisual output devices which are capable of communication of messages to a customer and which can instruct the customer in the operation of the machine. Of course when automated transaction machines of the invention are incorporated with other devices which carry out other functions, other types of input devices associated with carrying out those other functions may also be included. The particular additional devices will depend on the environment in which the invention is used.

Cards 218 used with machine 210 may be various types of cards such as credit cards, or debit cards which include information for identifying the customer and/or their accounts. Also, "smart cards" which include a programmable memory with data thereon may be used. Such data may include information about the customer and their accounts. It may also include information representative of monetary value. Such value may be deducted from the memory as the card is used to make cash withdrawal purchases. Some cards may have the value thereon periodically replenished.

The housing 212 includes therethrough a receipt opening 226. The receipt opening is used to provide the customer with printed receipts for the transactions conducted at the machine. The housing further includes a sheet outlet opening 228. The sheet outlet opening 228 is used to deliver sheets dispensed from the machine to a customer.

The machine 210 further includes a sheet or note inlet opening 230. Note inlet 230 serves as a depository opening and is used for inserting notes or other types of sheets into the machine for storage. As indicated in phantom, in some embodiments the note inlet opening 230 may be rendered inaccessible by a movable cover 240. The cover 240 is selectively secured by a suitable locking mechanism 234. The cover may be used in circumstances where the machine operator only wants selected authorized personnel to be able to insert notes for storage in the machine. This may be the case when the machine operator wants customers to use the machine only as a cash dispenser. In some embodiments the cover may provide a note supporting surface or include a note holding structure such as a pocket to facilitate holding dispensed notes for the customer of the machine when the cover is in position.

As shown in FIG. 7 the housing of the machine further includes a connector 236. The connector 236 is operative to releasably receive machine readable media in the form of a plug in memory element 238. The plug-in memory element in the embodiment shown is used for holding data operative to cause the machine to produce messages that are to be provided to customers of the machine through the display 224. The plug in memory 238 may hold promotional messages which are displayed to customers of the machine on a timely basis. Such promotional messages may include for example discounts on certain merchandise or special offers which expire on a certain date. In one exemplary embodiment the plug in memory 238 may be supported on a smart card. In other embodiments other types of machine readable media such as those previously discussed may be used to store data and instructions. The plug in memory may include one or more promotional messages which are to be output only during certain times of day, on certain days of the week or during particular time periods.

Figure 8:
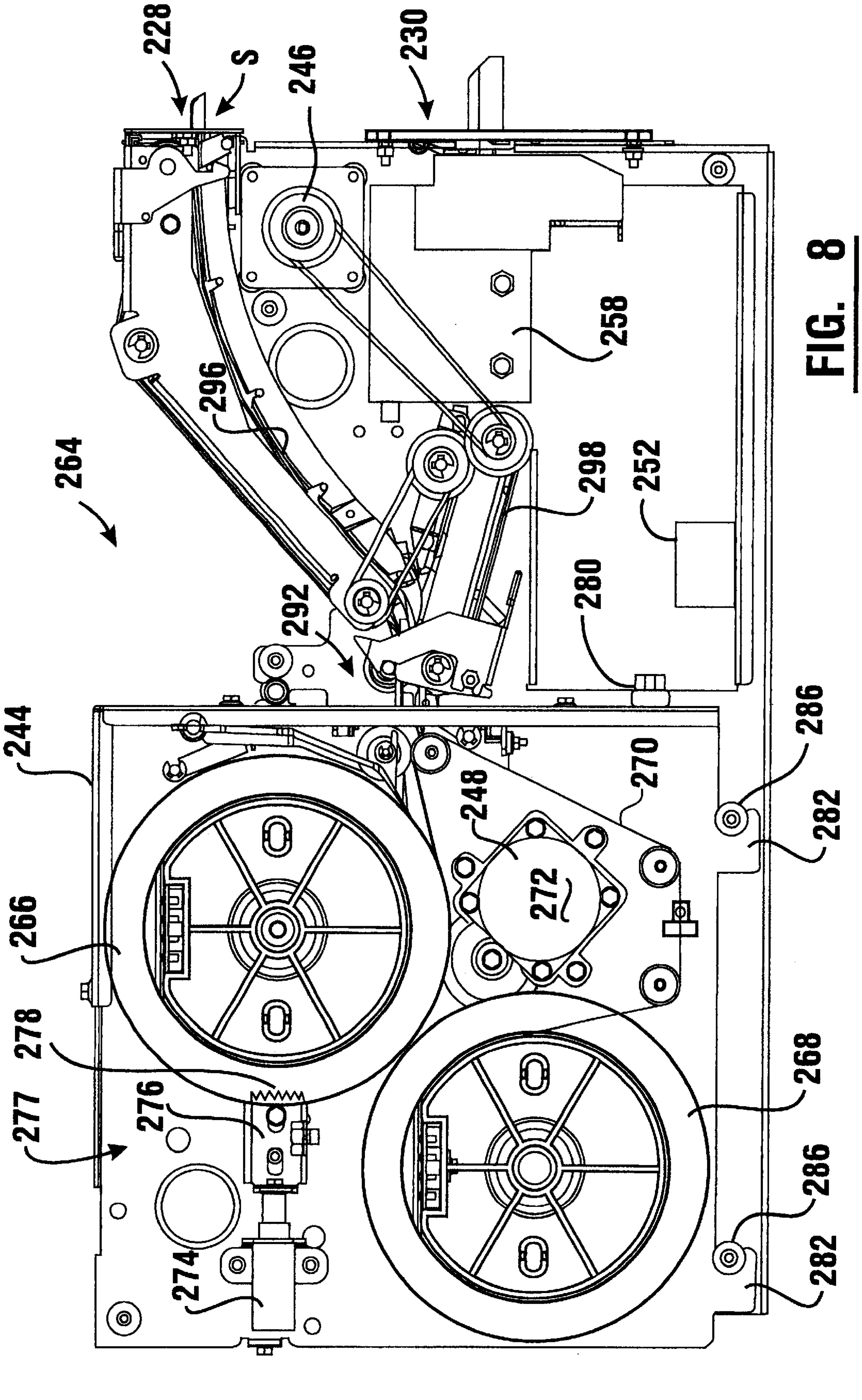
FIG. 8 is a transparent side view of the mechanisms for handling sheets such as currency notes in the automated transaction machine shown in FIG. 7.

FIG. 8 shows an exemplary sheet handling mechanism that may be used in machine 210 for storing and dispensing sheets. The sheet handling mechanism 264 includes a sheet storage module 244; controller 252; validator 258; storage reel 266; take-up reel 268; flexible web 270; reel drive mechanism 272; actuator 274; locking mechanism 276; sheet receiving and dispensing mechanism 277; projections and recesses 278; connector 280; tab portions 282; cylindrical support members 286; passage area 292; sheet outlet transport 296; sheet inlet transport 298; transport drive 246; and drive 248. The sheet handling mechanism includes the note storage module 244 which in the exemplary embodiment is removably mounted on the housing of the machine.

A controller 252 serves as a control device for controlling the electrical devices within the machine. The controller 252 includes an internal clock device schematically indicated 254 which in the exemplary embodiment is a function carried out with a processor. The controller is also in operative communication with a memory 256 which is also referred to herein as a data store. The controller 252 may in various embodiments include one or more processors or operatively connected computers which serve as an electrical signal source for devices which are in operative connection with the controller.

The controller is operative to communicate with the transaction function devices. These include the card reader 216, the keypad 220 and function keys 222 and the display 224. The controller is also operative to communicate and control operation of a receipt printer and a journal device, such as ajournal printer. The controller is also in operative communication with the plug in memory 238 and a communication device which is used to communicate with other devices. The controller 252 is also operative to communicate with other devices. These may include for example a note validator 258. The note validator is operative to sense notes to determine their validity for acceptance by the machine and to distinguish between valid and invalid notes inserted into the machine. The controller 252 is also operatively connected to one or more drives for controlling motors which operate devices and mechanisms to move notes within the machine. It should be understood that these transaction function devices are exemplary and that other embodiments of the invention may include different and/or additional types of transaction function devices.

The sheet handling mechanism generally indicated 264, includes the note storage module 244 which is removably mounted on the housing of the machine. The note storage module includes a storage reel 266 which is rotatably mounted in supporting connection with the housing of the machine in the storage module. A take-up reel 268 which may be similar to the storage reel, is also rotatably mounted in the machine. A flexible web 270 extends between the storage reel and the take-up reel.

The note storage module of the described embodiment includes thereon a reel drive mechanism 272. The reel drive mechanism is operative in a manner later discussed to selectively drive the storage reel 266 or the take-up reel 268 in selected rotational directions.

The note storage module 244 also includes an actuator 274. The actuator is in operative connection with a movable locking member 276. The locking member 276 is movable by the actuator 274 between a position in which rotational movement of the storage reel is enabled and a position in which the locking member holds the rotatable storage reel in relatively fixed position with respect to the note storage module 244. This is accomplished in the locking position of the locking member by engaging cooperating projections and recesses schematically indicated 278 on the locking member and the storage reel.

The actuator 274 is electrically connected with the controller 252 through a releasable connector 280. The controller 252 serves as an electrical signal source which operates the actuator generally to enable the storage reel 266 to move when it is properly positioned within the machine. When the note storage module is positioned in the machine and the releasable connector 280 connects the actuator 274 to the electrical signal source, the projections and recesses of the locking member and reel are disengaged enabling the reel to move. This feature aids in securing the note storage reel which serves as a note storage area, in fixed position relative to the module when the note storage module is removed from the machine. This makes it more difficult for unauthorized persons to extract the note from the note storage module after it has been removed from the machine.

The note storage module 244 is supported in the machine by tab portions 282. Axially elongated cylindrical support members 286 are accepted into openings when the note storage module 244 is in the operative position within the machine. The cylindrical support members 286 also serve as supporting members for the construction of the structure surrounding the note storage module within the machine. Members 286 include threaded openings in each end to facilitate their engagement to other components.

The note handling mechanism shown in FIG. 8 further includes a passage area 292. The passage area 292 extends through an opening in the front wall of the note storage module. Notes passing between the note receiving and dispensing mechanism of the note storage module pass through the passage area 292.

As shown in FIG. 8 a note outlet transport 296 extends between the passage area 292 and the note outlet opening 228. Note outlet transport 296 is operative to move notes in connection therewith. A note inlet transport 298 is operative to move notes between the note inlet opening 230 and the passage area 292. Note inlet transport 298 includes a portion which extends through the note validator 258. As previously discussed the note validator is operative to sense notes which pass through the note inlet transport. The note validator is operative to sense and determine if the sensed notes are valid for purposes of acceptance in the machine, and to discriminate between valid and invalid notes.

A transport drive 246 is operatively connected to the inlet and outlet transports 296 and 298 respectively. The note outlet transport 296 may include a belt and a plurality of note engaging idler rolls. The belt and idler rolls engage notes therebetween such that the notes move with movement of the belt between the passage area and the note outlet opening 228. It should be understood that while a belt and roll transport is used for the note outlet transport in the described embodiment, in other embodiments other configurations of cooperating belts, rollers or other moving members suitable for engaging and moving notes may be used.

The note inlet transport in the described embodiment includes note validator 258. In the described embodiment note validator 258 may be commercially available note acceptor which is operative to sense and determine the validity of certain types of bills. In the case of a machine which is configured to receive and dispense twenty dollar bills, the validator may be a device for sensing whether an inserted note is a valid twenty dollar bill. The notes move past the sensing mechanisms within the validator 258 as required for sensing the note and determining its validity for purposes of receipt within the machine. If an inserted note is determined not to be valid or otherwise not suitable for acceptance within the machine, a transport portion extending through the validator, after moving the note inward into the validator is operative to move it outward back through the note inlet opening 230. This is done by the validator operating based on its internal programming or in alternative embodiments operating in cooperating relation with the controller 252. Commercially available, compact size note validators may be used in the embodiment shown.

Figure 9:
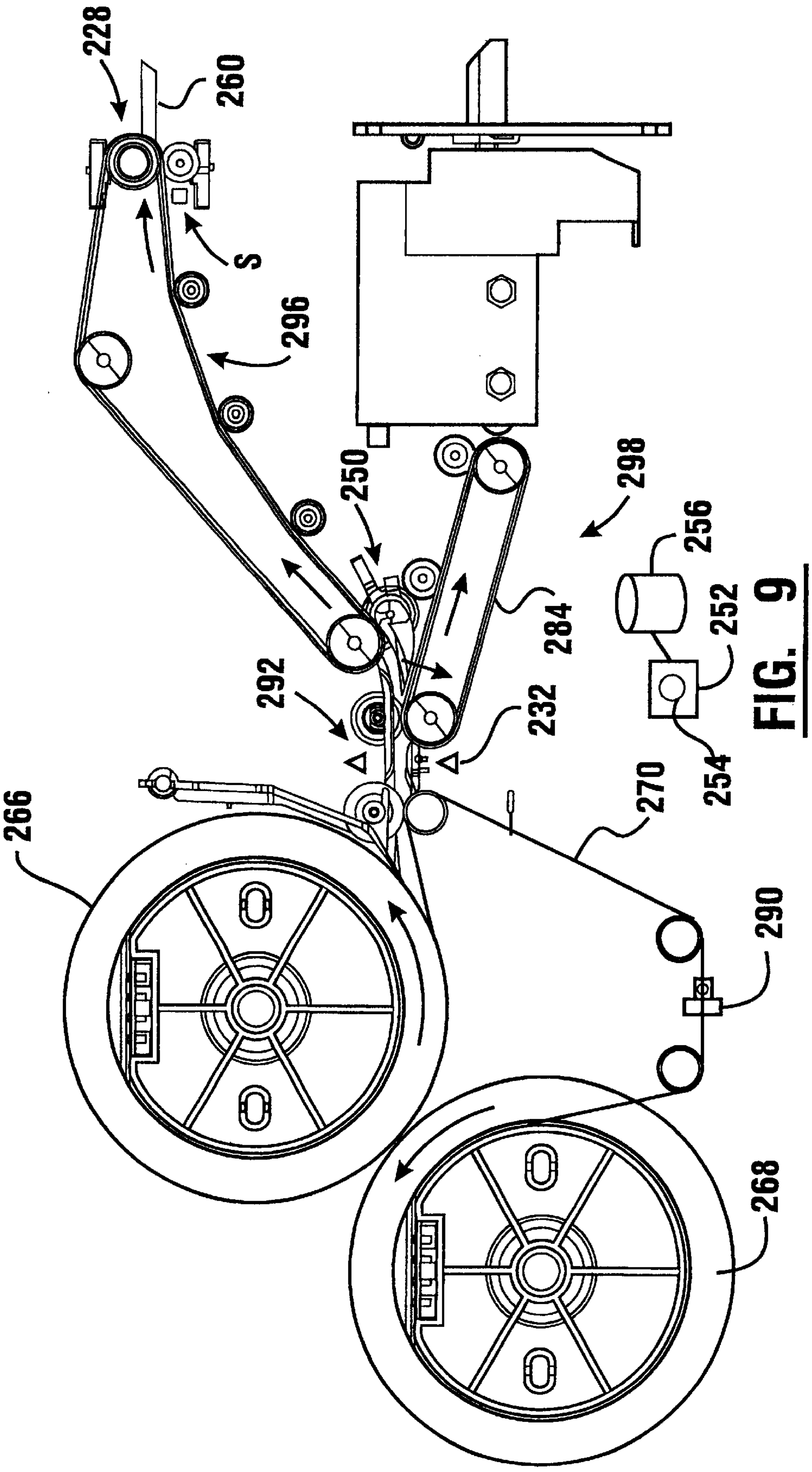
FIG. 9 is a side schematic view indicating movement of parts of sheet handling mechanisms when dispensing sheets.

FIG. 9 is a view indicating movement of parts of sheet handling mechanisms when dispensing sheets. FIG. 9 further shows clock device 254; memory 256; limited slip portion 284; gate 250; sensor 290; sensor 232; and sheet 260. The position sensor 232 is operatively connected to the controller 252 and is operative to sense sheets therein. The position sensor 232 is operative to sense an edge of the sheet entering the passage area 292. In response to the position sensor 232 or other input, the controller 252 is operative to operate the transport drive which operates the outlet transport 296. The outlet transport runs so that sheets in connection therewith move toward the sheet outlet opening 228. A gate 250 is positioned adjacent to the passage area 292. Gate 250 is operative to selectively direct sheets and enable the passage of sheets relative to the note inlet transport and note outlet transport.

FIG. 9 shows how the machine may operate to dispense sheets and to maintain a count of the number of sheets remaining. In the described embodiment sheets are dispensed responsive to a customer inputting an input through one or more of the input devices. This may include for example a customer passing a card through the card reader which includes account data corresponding to the customer. If the card is a debit card the customer may also input a personal identification number (PIN) through the keys of the keypad. The customer may thereafter indicate that they wish to withdraw notes and the value of the notes to be withdrawn through inputs through the function keys and/or the keypad keys. In response to these inputs the controller 252 is operative in the described embodiment to operate a communications device to determine through communication with another computer system whether the customer is authorized to withdraw the funds requested. Assuming that the customer is authorized to withdraw the funds, the communication device receives back from a host computer or other connected system, a message indicating that the requested withdrawal by the customer is permissible. The controller then operates the reel drive mechanism to rotate the take-up reel 268 in the direction indicated. This causes the storage reel to rotate in the direction shown. Rotation of the storage reel causes notes to be separated from the web 270 and moved into the note passage area 292.

As shown in FIG. 9 in the described embodiment a sensor 232 is positioned adjacent to the passage area 292. This position or passage sensor 232 is operatively connected to the controller 252 and is operative to sense sheets therein. A verification sensor S is also shown, although it should be understood that a plurality of verification sensors may be used. In the exemplary embodiment the verification sensor senses a sheet at a delivery position adjacent the sheet outlet 228. The verification sensor maybe operative to sense the leading edge and/or a trailing edge of a sheet. It should be understood that although the verification sensor shown senses a sheet, other verification sensors may sense items or conditions of devices that operate to enable delivery of sheets to a user of the machine.

In carrying out the dispense of sheets the controller 252 is operative to cause the transport drive to run the outlet transport 296. This is done in the exemplary embodiment responsive to passage sensor 232, sensing a sheet in position to be delivered to the outlet transport. The outlet transport runs so that notes in connection therewith move toward the note outlet opening 228. This motion of the outlet transport also causes the gate 250 to move to the directing position to engage notes with the outlet transport. In the described configuration, the outlet transport and a limited slip portion 284 of the inlet transport 298 move in cooperating relation so as to move notes from the passage area into engagement with the outlet transport.

The reel drive mechanism moves the web 270 in the note dispensing direction until the end of the sheet is sensed passing the passage sensor 232. The sheet passing the passage sensor is carried by the outlet transport 296 to the outlet opening 228 where it may be delivered to the customer. This is represented by a note 260. The note at the outlet opening may be held in a tray or by other suitable holding devices until taken by the customer. Alternatively a sensor S adjacent to the outlet opening which is connected to the controller, may cause the controller to operate to stop the outlet transport and to hold the sheet in connection with the outlet transport in a stopped relation until the customer physically pulls it from the opening and removal of the sheet is sensed. Various approaches to delivering the sheets may be used depending on the nature and character of the transaction machine.

Additional sheets beyond one may be delivered. The controller 252 operates the reel drive mechanism to dispense additional sheets through the passage area and to deliver them through the outlet transport to the customer. When the desired number of sheets has been dispensed which corresponds to the input from the customer, the controller operates to stop both the reel drive mechanism and the outlet transport.

In the course of dispensing sheets from the storage reel, the passage sensor senses each sheet. The passage sensor may be a radiation type sensor that is capable of sensing both the leading and trailing edges of the sheet. Of course in other embodiments of the invention other types of passage sensors may be used. As the web 270 moves to deliver one or more sheets to the passage area, the web sensor 290 provides signals to the controller 252. In response to the sensing of machine readable indicia on the web by the sensor 290 the controller generates signals. These signals include data representative of sheet quantities. This may include for example in some embodiments a simple count which corresponds to a length of web remaining on the storage reel. Because the notes are generally spaced at a uniform spacing this count data is representative of a quantity of sheets remaining. This data can be stored in the memory 256 as a quantity condition which corresponds to the number of sheets remaining.

Alternatively the sensor 290 may be operative to sense the number of indicia which pass the sensor as a sheet is moved through the passage area as sensed by the sensor 232. The number of indicia on the web which pass the sensor 290 as a single note is dispensed (or multiple notes are dispensed) can be correlated with the distance of the location adjacent the sensor to the end of the web. For example, the controller may be operative responsive to the sensor sensing more than a determined number of such indicia during the dispense of a single note, to store and a provide an indication of a quantity condition which indicates that the machine is in need of note replenishment.

In addition to using the machine readable indicia on the web to provide data representative of the quantity of notes remaining, the controller 252 may also be operative to cause actual count data or data representative of a value to be stored in memory 256. In this way the controller may be operative to maintain information on how many notes remain stored in the machine at any time. This may enable a customer to query the controller to determine the number of remaining notes.

In the event that the described form of the controller should experience a failure of the volatile memory data concerning the number of notes remaining, the controller may operate the machine to execute a recovery operation to determine how many notes are remaining. The executable steps necessary to perform this recovery operation may be stored in nonvolatile memory so that the machine can almost always execute the recovery operation no matter what conditions are experienced. In the recovery operation the controller responds to a loss of available memory data by operating the reel drive mechanism to wind the web 270 onto the storage reel 266. The reel drive mechanism continues to wind the web onto the storage reel until a first end area adjacent the end of the web attached to the take-up reel is sensed. This may be done a number of ways, for example by the sensor 290 sensing a set number of machine readable indicia on the web within a given time period which the controller determines through use of the clock device 254.

Once the controller has determined that the web has been wound onto the storage reel to generally the full extent, the controller operates the reel drive mechanism to begin moving the web from the storage reel to the take-up reel. As the reel drive mechanism is operated by the controller to do this, the controller generates signals responsive to indicia sensed by the web sensor 290. These signals are indicative of how far the web has moved at any given time. The process of winding the web onto the take-up reel is stopped when the passage sensor 232 senses the first note entering the first passage 292. At this point the controller 252 may be operative to generate a further signal which corresponds to the location on the web where first sheet is sensed. Because the sheets are generally stored in relatively uniformly spaced relation, the further signal generated is indicative of a number of sheets that remain in supporting connection with the web on the storage reel. This enables the controller to closely determine how many sheets remain in storage. Further operation of the machine dispensing and receiving sheets may thereafter be continued using the data corresponding to the sheet quantity determined through the recovery operation. Of course this is but one example of operation of the machine used in connection with a described embodiment. In other embodiments other approaches to calculating and determining the number of sheets in storage at any given time may be used.

Figure 10:
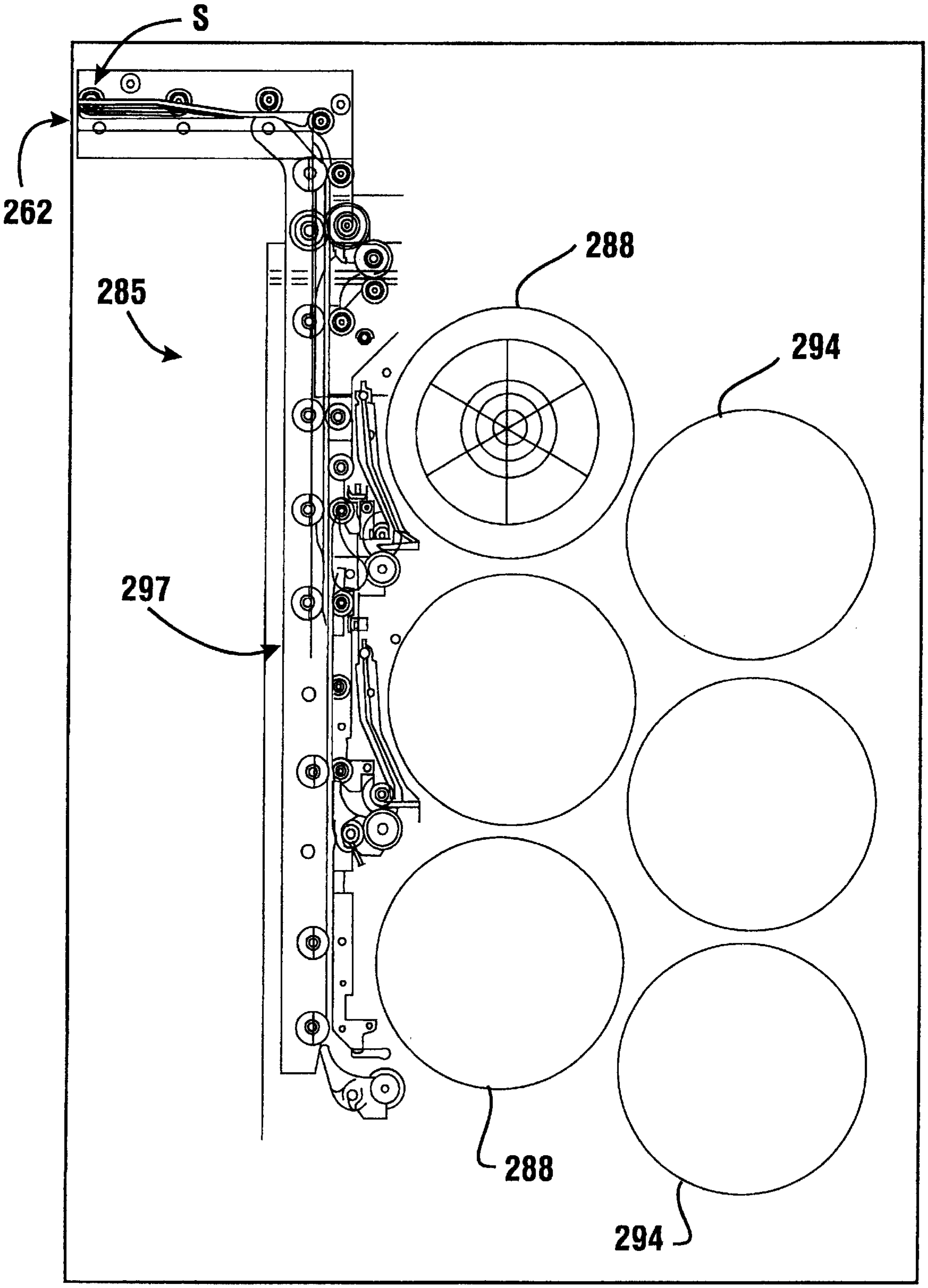
FIG. 10 is a side view of an alternative exemplary automated transaction machine of the present invention having plural sheet storage reels.

FIG. 10 schematically shows an alternative sheet handling mechanism of the storage reel and take-up reel type. The handling mechanism 285 is operable to dispense one or more sheets to a customer at outlet opening 262. Each reel drive mechanism is operative in a manner to selectively drive a storage reel 288 or a take-up reel 294. The outlets from each mechanism is connected to a common transport path 297. The plurality of sheet storage reels may be used for storing and dispensing different denominations of sheet currency. Additionally, in some embodiments at least one sheet storage reel may be used for storing special test sheets. These may be sheets of the types previously described such as coupons or advertising.

A verification process to assure that the dispensing path has not been subject to malfunction or tampering may be carried out in the machines described in FIGS. 9 and 10 in a manner generally similar to the verification process previously discussed. For example, if a withdrawal transaction request is made, then the dispensing path verification process is executed responsive to operation of the controller. If the test sheet reaches the sheet outlet opening 262 or 228 so as to be accessible to the customer without a fault condition being detected, then the dispensing path is deemed verified as in operating condition. The test sheet may be a first bill to be dispensed in the case of the mechanism in FIGS. 9 or 10, or in the case of a mechanism like that shown in FIG. 10, it may be a coupon, advertising or other non-currency, low value sheet. Thereafter, the balance of the requested withdrawal or other sheet dispensing transaction process may proceed by the controller operating to dispense additional requested sheets to the customer.

Signals from the verification sensor S located adjacent to the sheet outlet opening 262 or 228 may be used to verify whether the test sheet successfully reached the outlet opening. A successful verification may also be time dependent based on the programming associated with the controller. Additional verification sensors may be located along the transport paths for sensing proper operation of the machine. Also as previously discussed, the machine may be programmed and arranged to self-test for dispensing path integrity as discussed in connection with the prior embodiment. Such self testing may include moving a sheet from storage to adjacent the outlet and then retracting the sheet back into the machine or into storage. The self testing feature may execute the verification process in connection with transactions or may operate independent of requested transactions.

Figure 11:
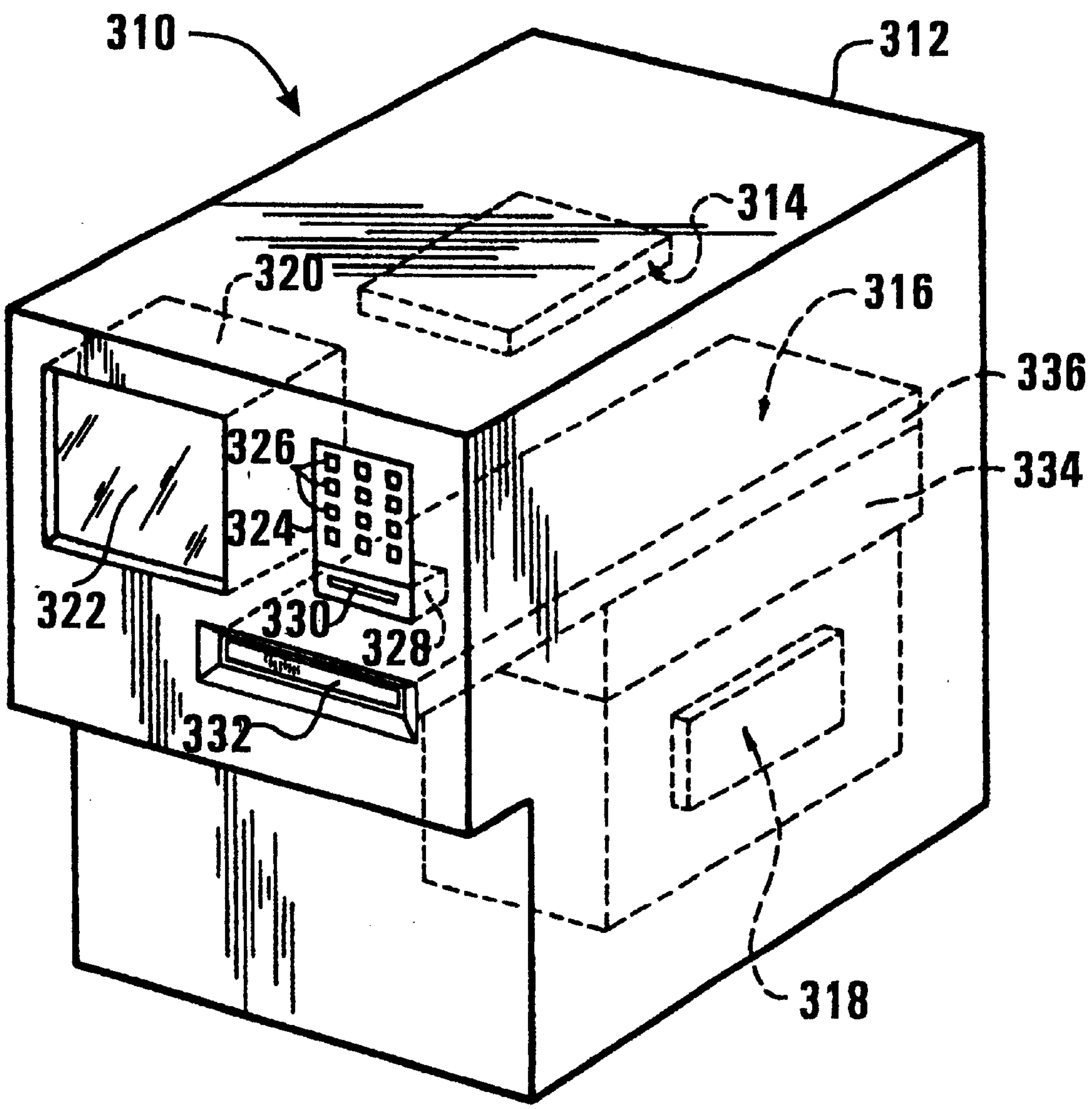
FIG. 11 is a schematic view of another alternative exemplary embodiment of an automated transaction machine of the present invention.

Another exemplary embodiment of an automated transaction machine in which the present invention may be implemented is shown in FIGS. 11 through 15. The automated transaction machine includes sheet handling and dispensing mechanisms similar to those shown in the above mentioned U.S. Pat. No. 5,240,368. As shown in FIG. 11, the machine 310 includes a housing 312; an ATM processor 314; dispensing mechanism 316; dispenser processor 318; video monitor 320 including a screen 322; keypad 324; keys 326; card reader 328; card slot 330; sheet dispensing outlet opening 332; feed module 334; and stacking module 336.

The automated transaction machine 310 is operated to dispense sheets upon request to individuals meeting predetermined criteria. Machine 310 includes a housing 312 which encloses the controller 314, the dispensing mechanism 316, and the dispenser processor 318 for controlling the operation of dispenser 316.

The controller 314 basically controls certain aspects of the dispensing routine for example, the financial record keeping aspects and customer interface of the machine 310. To facilitate these functions, associated with the controller are the video monitor 320 including the screen 322 visible from the exterior of housing 312, the keypad 324 including a plurality of keys 326 for use by a customer for entering inputs to controller 314, and the card reader 328 for reading information from cards having identification data encoded thereon. A card is inserted into card reader 328 through a card slot 330 provided in housing 312. A currency dispensing outlet opening 332 is provided in housing 312 for dispensing currency or other sheets to a customer or user of the machine 310.

The following discussion of the use and operation of the machine is based upon a sheet dispensing transaction involving financial value wherein a customer must have a predetermined status. It should be understood that the transactions discussed are exemplary and the principles of the invention may be applied in other types of machines and transactions.

Use of the machine 310 is initiated by a customer inserting a card into card slot 330. The card, which is read by card reader 328, provides information identifying the cardholder and/or their account. If the sheet media such as currency bills contained within the machine 310 has value, typically an approval of the customer's further status as an authorized user is required. The machine controller 314 may have an internal record file in an associated data store including the account numbers of all customers for whom access to the machine is allowed. The machine controller 314 may alternatively connect via modem, dedicated line, or other device to an external record source such as a financial institution or credit authorization service to check the status of the input customer data. The controller operates in accordance with its programming to advise the customer via screen 322 of monitor 320 whether operation of the machine is allowed, and provides instructions as to procedures for the customer to follow to receive sheets from the machine 310. The transaction is conducted by the customer entering pertinent information and inputs (in response to prompts by the machine controller 314) using operation keys 326 on keypad 324. When the pertinent information has been entered and processed, controller 314 will instruct dispenser processor 318 as to the number of sheets to be dispensed. Having received instructions from the controller 314 with respect to the number of sheets to be dispensed, the dispenser processor 318 initiates dispensing of the sheets in a predetermined sequence.

As shown in FIGS. 12–15, the dispensing mechanism includes sheet storage areas 302 and 304; picker assemblies 360, 361; vertical sheet transport 380; belt flight 378*b;* vertical transport 382; horizontal transport 384; belts 386; belt flights 390*b;* stack plate 364; arms 366; divert plate 350; push plate 370; and gate 396. The dispensing mechanism also includes at least one verification sensor, schematically indicated S.

Dispenser processor 318 controls the movement of belts of vertical transport 380, belts of vertical transport 382, and belts of horizontal transport 384. The position of sheets and the condition of other sheet moving mechanisms and devices which enable movement of sheets may be sensed by verification sensors S. Dispenser processor 318 also initiates the operation of picker mechanisms 360 and 361 to pick individual sheets from sheet storage areas 302 and 304. If dispenser 316 contains sheets of different sizes, dispenser processor 318 may be programmed such that a particular type of sheet is picked first. This is often the sheet having the largest physical size, but could be other sheets including a test sheet as later discussed. In this respect, an individual sheet is picked which feeds the sheet toward flight 378*b* of belts of vertical transport 380. The sheet is driven to vertical transport 382 wherein belts move the sheet towards horizontal transport 384.

The leading edge of the sheet generally causes flight **390*b* of belts 386 to deform somewhat upward as the belts pull the leading edge of the sheet in the direction of the moving belt flight 390*b*. The amount of deflection depends on the thickness and rigidity of the sheet being transferred. This resilient deformability feature enables dispenser 318** to transfer more rigid sheets as well as more pliable sheets.

Figure 12:
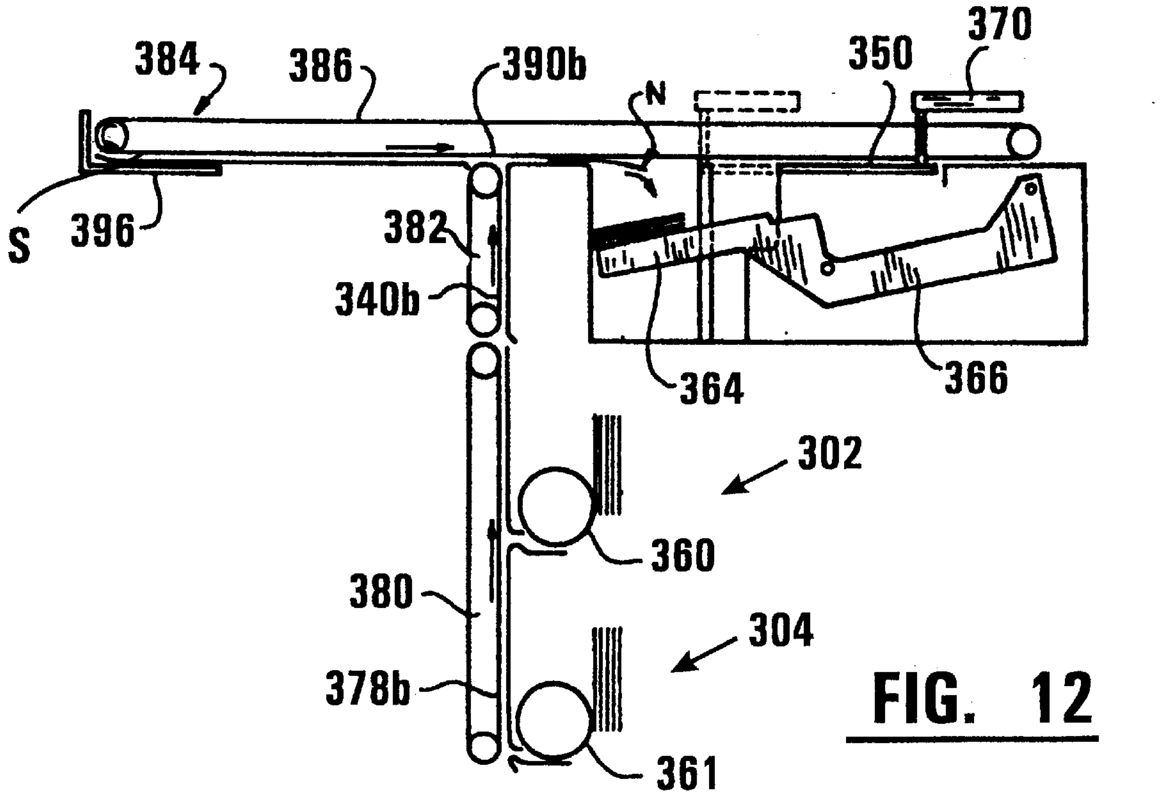
FIGS. 12–15 are representative views of the dispensing mechanism according to the automated transaction machine of FIG. 11 at various stages of operation.

During a sheet delivery operation a sheet moved upwards in vertical transport 382 as shown in FIG. 12 may be driven horizontally by horizontal transport 384 until it is positioned in an accumulator storage location above stacking plate 364. As the horizontal movement of the sheet brings it to a position above stacking plate 364 it is moved downward onto stack plate 364. This is indicated by a sheet schematically indicated N in FIG. 12.

If a second type or denomination of sheet, possibly a smaller sheet, is to be dispensed, such sheets are transferred from their respective storage areas. During the stacking of the smaller sheets, a divert plate 350 and a push plate 370 are repositioned by dispenser processor 318 to provide an appropriately positioned stop for the smaller sheet as it is accumulated in a stack in the storage location. Again, the position of divert plate 350 and push plate 370 is determined and controlled responsive to operation of the dispenser processor 318 based upon the information received or stored with respect to the length of the smaller sheet in the direction of movement. The smaller sheet is then stacked on the larger sheet.

Figure 14:
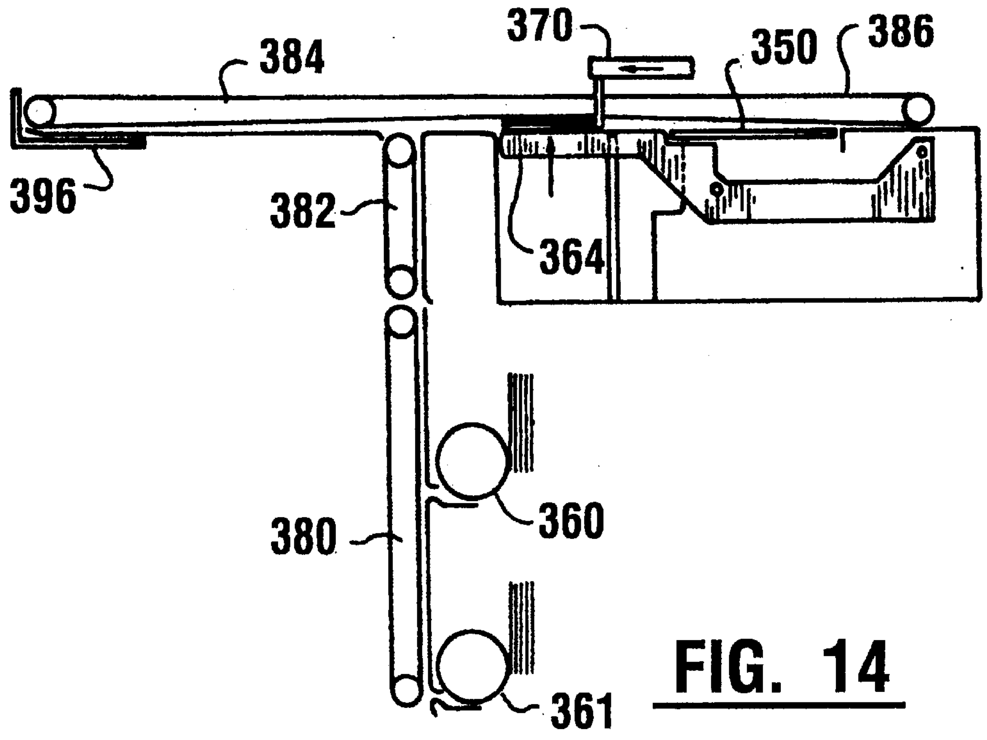
Figure 15:
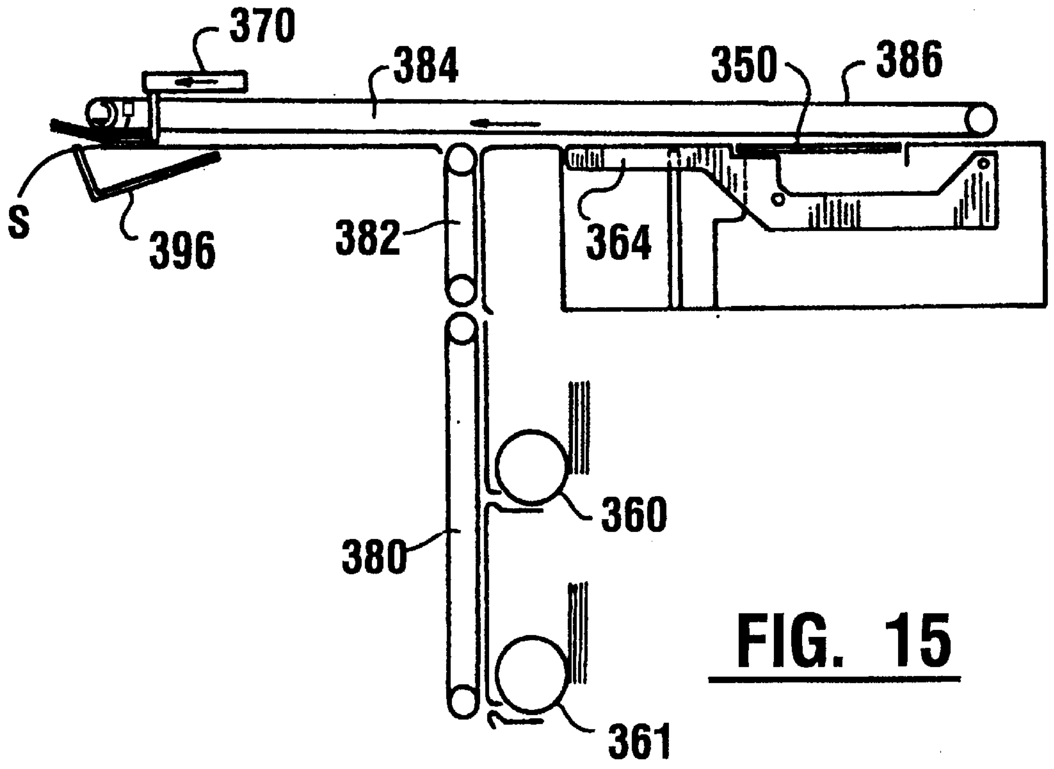

Upon completion of the stacking of the sheets to be dispensed in the accumulator storage location, push plate 370 is moved back to clear stack plate 364 which is moved from its lowered stacking position shown in FIG. 12 to a second elevated position shown in FIG. 14. Then push plate 370 is caused responsive to operation of dispenser processor 318 to drive the stack of sheets toward a delivery position adjacent gate 396. The gate 396 may include a cover for selectively enabling customer access. Simultaneously, belts of horizontal transport are driven such that flight **390*b* moves toward gate 396. As the stack of sheets is moved toward gate 396, the leading edge of the stack encounters an exit position sensor. Upon exit sensor sensing the leading edge of the stack, dispenser processor 318 causes gate 396 to move to open a slot. Dispenser processor 318 then causes push plate 370 to move the stack of sheets a predetermined distance through the slot to be accessible to the customer. The predetermined distance is based upon the size parameters of the sheets. This is shown schematically in FIG. 15. At least one verification sensor S is capable of detecting whether the sheet or sheets, or the devices or mechanisms which move or which enable movement of sheets, are operative to enable sheets to move to a position in which they are accessible to the customer. The customer may then take the sheets presented through the slot which is generally aligned with dispensing opening 332 in housing 312**. When the sheets are removed by the customer, the at least one sensor detects such removal.

Figure 13:
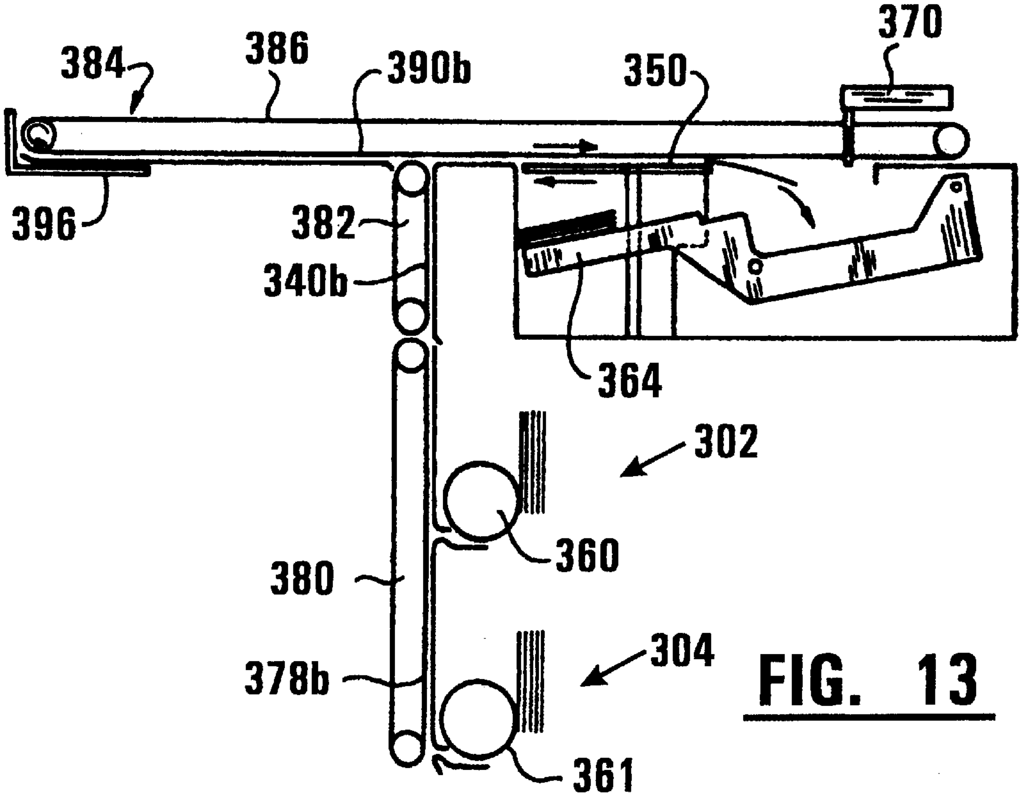

In the event that the stack of sheets presented is sensed by a sensor as not taken by the customer, then in this exemplary embodiment dispenser processor 318 causes push plate 370 to move back a predetermined distance and belts of horizontal transport 384 to reverse direction to move the stack of sheets away from gate 396. A sensor indicates when all the sheets have been moved away from the slot. Push plate 370 is moved back to a home position, and belts of horizontal transport 384 are actuated to transfer the untaken sheets to a divert area adjacent stacking module 336. This is represented in FIG. 13. Information regarding the untaken sheets is communicated to processor 314 via dispenser controller 318. Upon completion of the transaction, the machine processor 314 may provide a customer with a printed summary or receipt of the transaction via a printer.

In the exemplary embodiment the sheet delivery operation already described is modified to attempt to verify that the transport path is unobstructed before attempting to deliver at least some of the sheets. The verification sensors S are in operative connection with the controller 314 and/or dispenser processor 318. The verification process in this exemplary embodiment may be similar to the verification methods discussed in connection with previous embodiments. If for example a withdrawal transaction request is made by a customer, the dispensing path verification process is first carried out responsive to programmed instructions. If a test sheet can be moved through the dispensing path to the delivery position and/or through the outlet to a customer, or in another manner which verifies that the dispensing path is properly operating, the operability of the machine for dispensing is deemed verified. Thereafter, the requested withdrawal transaction is completed by dispensing at least one further sheet.

At least one verification sensor S is positioned in a delivery position adjacent a sheet outlet opening accessible to the customer in this example. The signals from the verification sensor may be used to verify that the test sheet successfully reached the sheet outlet opening. Determination of the proper operation of the dispensing path may also be time dependent. An in additional verification sensor may be operative to sense whether gate 396 is open or closed. An open gate at the beginning of the verification process, or the gate opening out of predetermined order, may be indicative of tampering, and may be used to indicate a fault in the verification process. Such a fault may cause the machine to automatically notify authorities, capture video images or take other actions. Additional verification sensors may be located along the transport paths for more detailed verification and monitoring of operation of the machine. Also, as previously discussed in relation to the previous embodiments, the machine may be programmed to self-test for dispensing path verification. The self-test may occur responsive to a transaction request and/or may occur on a timed or other periodic or random basis responsive to programming associated with the controller(s).

As can be appreciated, in this embodiment test sheets can be a particular type of sheet having low or no monetary value, that are stored in a storage area associated with a particular picker mechanism. A test sheet such as a coupon may be picked, transported and presented to every customer who initiates any or a selected type of transaction at the machine. The controller may additionally be programmed to present a promotional message associated with the coupon. If the customer does not take the coupon by or after a particular time delay, the coupon may be retracted. The retracted coupon may be moved to a divert area or may be retracted to the stack plate area so that the customer will receive it anyway with any requested sheets. In either case the verification process establishes that a sheet can reach the customer. The positive result of the verification process is operative to cause the controller to operate the machine to further conduct sheet dispensing transactions.

Alternatively the machine may be programmed to move test sheets in a different manner to verify the proper operation of the machine through the dispensing path. For example in performing a transaction which includes a plurality of sheets, a relatively low value sheet may be moved to the customer first and instructions are output to the customer to take it. The machine may then operate in response to the successful delivery of this first sheet to deliver a stack containing a balance of requested sheets in the usual manner. The positive result of the verification process may be considered to have been achieved in circumstances where either the test sheet is taken initially by the customer, or the test sheet is presented and then retracted for divert or incorporation in a stack.

Alternatively, the controller may be programmed to carry out the verification process differently. For example, the controller may operate devices such as gate 396 when no sheets are adjacent thereto to assure proper operation. A test sheet may also be moved inside the machine just inside the closed gate to verify through signals from appropriate verification sensors that the sheet can reach the area adjacent the gate. Thereafter the sheet may be moved to the stacking area. In response to the successful completion of this verification process the remaining requested sheets may be stacked and presented in the usual manner.

As can be appreciated numerous verification processes within the scope of the present invention may be carried out. Such processes may employ verification sensors specifically used to verify operation or sheet movement, or may employ sensors that are used in connection with other sheet sensing and moving functions. Sensors may be radiation type sensors, acoustic sensors, contact sensors or other sensors suitable for sensing the physical presence of a sheet. Alternatively, properties or positions of sheet moving and positioning devices may be used to determine sheet position in response thereto. Other types of sensing may be carried out responsive to the invention. The verification processes are useful in reducing the risk that transactions are prevented or customer's further funds or valuable sheets are lost due to malfunctions or malicious tampering with the machine.

The present invention relates to an automated transaction machine capable of verifying that the dispensing path to the customer is operable prior to dispensing sheet materials. Moreover the descriptions and illustrations given herein above of various automated transaction machines and their dispensing mechanisms are by way of examples and the invention is not limited to the exemplary details shown or described in the automated transaction machines.

Furthermore, the verification system and method may be applied to accepting deposits into automated transaction machines, or other types of transactions. For example, upon a customer making a request for a deposit, the machine controller may be programmed to go into a deposit verification mode. For example, prior to making a deposit the customer may be required to insert a test sheet or article into a depository opening on the machine. The test sheet or article may be readily available to the customer outside of the machine in a form of a deposit form or an empty envelope. Alternatively the test sheet may be provided to the customer by the machine by dispensing the test sheet to the customer. In cases where the item is dispensed it may be a personalized sheet printed with a printer in the machine to include customer information or transaction information or other indicia. The customer may be instructed through prompts on a display screen or other outputs from output devices on how to insert the test sheet into the depository opening. Test sheets which are personalized to the customer or unique to the transaction may help to identify a particular customer further deposit or aspects thereof in a deposit audit activity.

Verification sensors may be located along the deposit receipt path to verify that the test sheet successfully traveled the transport paths to the deposit storage area. A successful determination may also be based on time dependent aspects of the operations. At least one verification sensor may be located adjacent the entrance to the deposit storage area to verify that the test sheet actually reached the deposit area. The failure of a test sheet to reach the designated deposit area would cause a fault to be indicated, and the machine may provide a message at the customer interface that deposits are currently not being accepted. However, a test sheet detected at the deposit area would indicate that the machine is operative to accept deposits. The test sheet, after reaching the deposit area and detected, may then be diverted into a test sheet storage area, similar to the manner as previously discussed. Alternatively the test sheet may be used to document, verify or separate deposits. The test sheet may alternatively be recycled for reuse.

Alternatively a machine employing a deposit verification feature may be programmed to self-test for deposit path verification by first sending a test sheet from a storage area to a customer deposit opening, and then by moving the test sheet from the deposit opening to a deposit storage area of the machine. Alternatively or in addition, the dispensing of a deposit test sheet to the customer may be used to test the dispensing path. This enables performing this additional desirable function. Of course other approaches may be used depending on the machine and the types of transactions being carried out.

Thus the new automated transaction machine and method of the present invention achieves the above stated objectives, eliminates difficulties encountered in the use of prior devices and systems, solves problems, and attains the desirable results described herein.

In the foregoing description certain terms have been used for brevity, clarity and understanding. However, no unnecessary limitations are to be implied therefrom because such terms are used for descriptive purposes and are intended to be broadly construed. Moreover the descriptions and illustrations given herein are by way of examples and the invention is not limited to the exact details shown or described.

In the following claims any feature described as a means for performing a function shall be construed as encompassing any means known to those skilled in the art to be capable of performing the recited function, and shall not be deemed limited to mere equivalents of the particular means described in the foregoing description.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

What is claimed is:

1. A method comprising:

(a) receiving a request from a user through at least one input device on an automated transaction machine, to conduct a transaction including the dispense of at least one sheet from the machine to the user;

(b) operating the machine to move a test sheet responsive to the request, from a storage area in the machine to a delivery position from which sheets are delivered from the machine;

(c) sensing if the test sheet reaches the delivery position;

(d) responsive to sensing that the test sheet reaches the delivery position, completing the transaction including moving at least one further sheet from at least one storage area in the machine to the delivery position.

2. The method according to claim 1 wherein in step (a) the transaction includes the dispense of currency sheets.

3. The method according to claim 1 wherein in step (b) the test sheet comprises promotional material.

4. The method according to claim 3 wherein in step (b) the test sheet comprises a coupon.

5. The method according to claim 2 wherein in step (b) the test sheet is a non-currency sheet.

6. The method according to claim 2 wherein in step (b) the test sheet is a lowest denomination currency sheet dispensed to the user in the transaction.

7. The method according to claim 1 wherein in step (c) sheets in the delivery position are accessible to the user requesting the transaction.

8. The method according to claim 1 wherein in step (c) sheets in the delivery position are not accessible to the user requesting the transaction, and further comprising delivering the at least one further sheet to the user.

9. The method according to claim 1 and prior to step (d) further comprising:

(e) retracting the test sheet from the delivery position to a storage location in the machine.

10. The method according to claim 9 wherein in step (d) the test sheet is moved to the delivery position with the at least one further sheet.

11. The method according to claim 9 wherein in step (e) the test sheet is retracted to an accumulator storage location wherein a stack of sheets may be accumulated, and prior to step (d) further comprising:

(f) moving the at least one further sheet to the accumulator storage location.

12. The method according to claim 11 and subsequent to step (f) further comprising:

moving the test sheet and further sheet from the accumulator storage location to the delivery position.

13. The method according to claim 7 and further comprising:

sensing that the test sheet has been delivered out of the machine, and wherein step (d) is not performed unless the test sheet is sensed as delivered out of the machine.

14. The method according to claim 13 and prior to step (d), moving the at least one further sheet into a stack in an accumulator storage location in the machine and wherein in step (d) the stack moves to the delivery position.

15. The method according to claim 7 and further comprising:

(e) instructing the user through at least one output device on the machine to deposit the test sheet into the machine.

16. The method according to claim 15 and further comprising receiving the test sheet into a depository opening on the machine.

17. The method according to claim 1 and comprising prior to step (c), printing indicia corresponding to at least one of the user and the transaction on the test sheet.

18. The method according to claim 17 and further comprising:

(e) instructing the user through at least one output device on the machine to deposit the test sheet into the machine.

19. The method according to claim 16 and further comprising storing the test sheet received in the depository opening, in a storage location in the machine.

20. The method according to claim 1 and prior to step (c) further comprising:

sensing the test sheet in at least one location between the storage area and the delivery position.

21. Computer software in at least one processor in the automated transaction machine operative to cause the machine to carry out the method recited in claim 1.

22. Machine readable media including instructions that are operative to cause at least one processor in the automated transaction machine to carry out the method recited in claim 1.

23. A method comprising:

(a) operating an automated banking machine to move a test sheet from a storage area in the machine to a delivery position from which sheets are delivered to users of the machine;

(b) sensing if the test sheet reaches the delivery position; and either:

(c) responsive to sensing that the test sheet reached the delivery position in step (b), enabling the machine to carry out a transaction including delivery of at least one further sheet to the delivery area; or (d) responsive to sensing that the test sheet did not reach the delivery position in step (b), operating the machine to prevent the carrying out of a transaction including the delivery of one further sheet to the delivery area.

24. The method according to claim 23 and comprising prior to step (a), receiving a transaction request from a user through at least one input device on a user interface on the automated banking machine, wherein step (a) is carried out responsive to the transaction request, and wherein the test sheet comprises promotional material.

25. An automated transaction machine, comprising a sheet material handling mechanism including a sheet material dispensing path extending from a storage area to a delivery position, and at least one processor in operative connection with said sheet material handling mechanism, wherein the processor is operative to cause the machine to test whether the sheet material dispensing path is unobstructed prior to completing a sheet material dispensing transaction.

26. An automated transaction machine, comprising a sheet material handling mechanism including a sheet material dispensing path, wherein the sheet material dispensing path includes a sheet material outlet opening, wherein the sheet material outlet opening is accessible to customers at the automated transaction machine, a sensor located adjacent the sheet material outlet opening which is operative to sense a sheet at the sheet material outlet opening, at least one processor in operative connection with said sheet material handling mechanism and the sensor, wherein the processor is operative to cause the machine to test whether a sheet may move to the outlet opening prior to completing a sheet material dispensing transaction.

27. An automated transaction machine, comprising a sheet material handling mechanism including a sheet material dispensing path, wherein the sheet material dispensing path includes a sheet material outlet opening, wherein the sheet material outlet opening is accessible to customers at the machine, a sensor located adjacent the sheet material outlet opening operative to sense a sheet adjacent the sheet material outlet opening, at least one processor in operative connection with the sheet material handling mechanism and the sensor, wherein the processor is operative to cause the machine to send a test sheet toward the outlet opening prior to completing a sheet material dispensing transaction, wherein the processor, upon the sensor sensing that the sheet may move through the outlet opening, completes the sheet material dispensing transaction by moving at least one further sheet towards the outlet opening.

* * * * *